(12) United States Patent
Ruuttu et al.

(10) Patent No.: US 10,874,111 B2
(45) Date of Patent: Dec. 29, 2020

(54) METHOD FOR PREPARING FISH PRODUCT

(71) Applicant: Arctic IP Technologies ApS, Kongens Lyngby (DK)

(72) Inventors: Jari Ruuttu, Salo (FI); Petteri Kinnunen, Salo (FI)

(73) Assignee: ARCTIC IP TECHNOLOGIES APS, Kongens Lyngby (DK)

( * ) Notice: Subject to any disclaimer, the term of this patent is extended or adjusted under 35 U.S.C. 154(b) by 60 days.

(21) Appl. No.: 16/063,377

(22) PCT Filed: Dec. 16, 2016

(86) PCT No.: PCT/FI2016/050884
§ 371 (c)(1),
(2) Date: Jun. 18, 2018

(87) PCT Pub. No.: WO2017/103340
PCT Pub. Date: Jun. 22, 2017

(65) Prior Publication Data
US 2019/0335771 A1    Nov. 7, 2019

(30) Foreign Application Priority Data

Dec. 18, 2015 (FI) ........................... 20155968

(51) Int. Cl.
*A23B 4/027* (2006.01)
*A22C 25/16* (2006.01)
(Continued)

(52) U.S. Cl.
CPC ............ *A23B 4/027* (2013.01); *A22C 25/166* (2013.01); *A23B 4/015* (2013.01); *A23B 4/16* (2013.01);
(Continued)

(58) Field of Classification Search
CPC ........... A23B 4/16; A23B 4/015; A23B 4/325; A23B 4/00; A23B 4/027; B65D 81/28; B65D 81/18; A22C 25/16; A22C 25/166
(Continued)

(56) References Cited

U.S. PATENT DOCUMENTS

2017/0121041 A1* 5/2017 Jari ...................... B65D 81/203

FOREIGN PATENT DOCUMENTS

| CL | 200101053 | 9/2004 |
|---|---|---|
| EP | 1 284 604 B1 | 7/2005 |

(Continued)

OTHER PUBLICATIONS

International Search Report and Written Opinion for Application No. PCT/FI2016/050884 dated Mar. 10, 2017.
(Continued)

*Primary Examiner* — Vera Stulii
(74) *Attorney, Agent, or Firm* — Alston & Bird LLP

(57) ABSTRACT

A method for preparing a fish product. In the method, a slaughtered fish is filleted in pre-rigor state, skin is removed from the fillet in pre-rigor state, the skinless fillet is arranged in a pre-salting process in pre-rigor state and allowed to remain there for the pre-salting period, the fillet is removed from the pre-salting process, the fillet is arranged in its transport package, in which it is subjected to a second salting process, and the fillet is allowed to remain in the transport package for at least one day.

31 Claims, 21 Drawing Sheets

Figure 1:
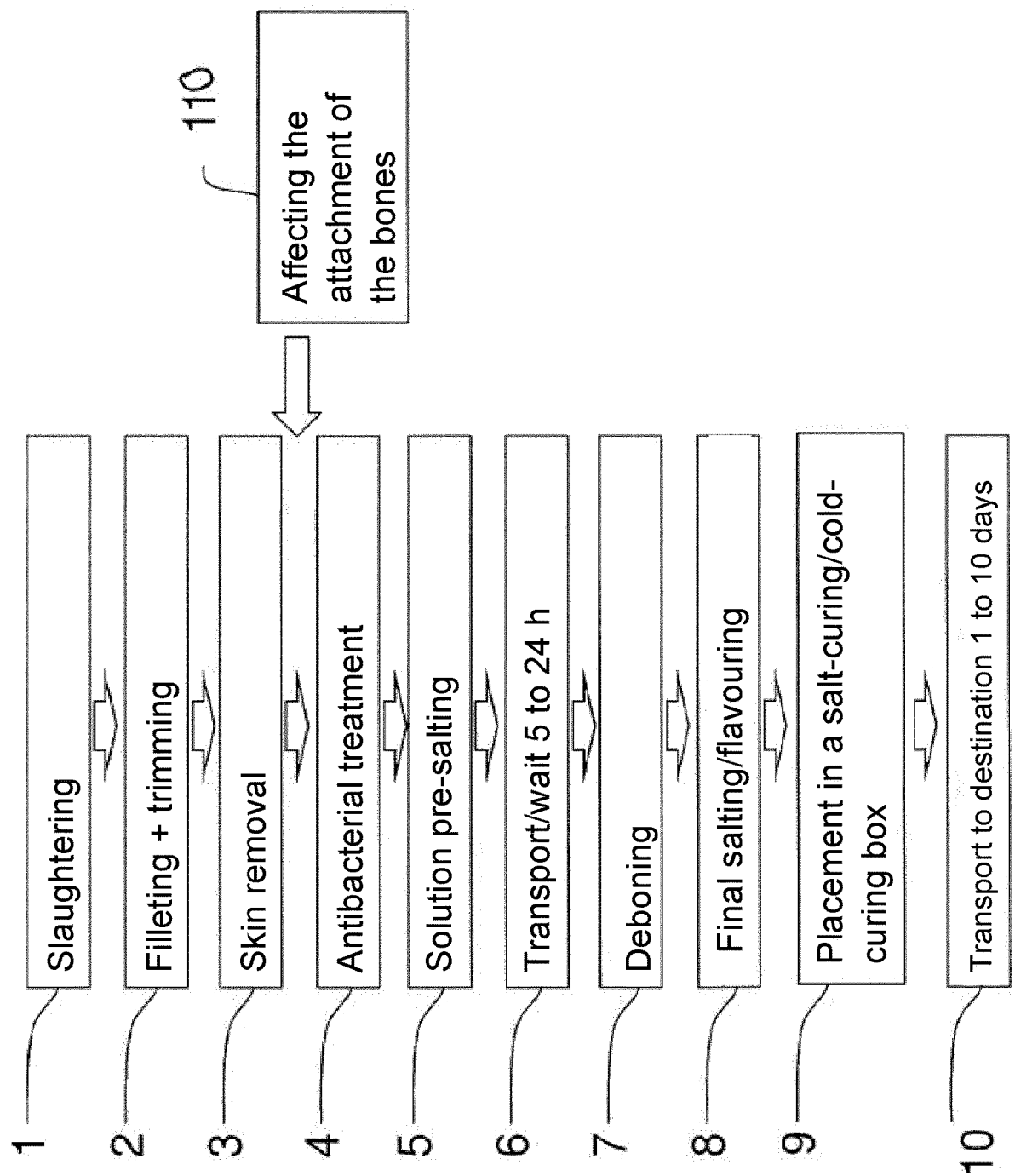

(51) Int. Cl.
  *A23B 4/015* (2006.01)
  *A23B 4/16* (2006.01)
  *A23B 4/32* (2006.01)
  *B65D 81/18* (2006.01)
  *B65D 81/28* (2006.01)

(52) U.S. Cl.
  CPC .............. *A23B 4/325* (2013.01); *B65D 81/18* (2013.01); *B65D 81/28* (2013.01)

(58) Field of Classification Search
  USPC ....... 426/129, 396, 316, 320, 418, 312, 332, 426/324, 643
  See application file for complete search history.

(56) References Cited

FOREIGN PATENT DOCUMENTS

| | | | |
|---|---|---|---|
| FI | 20140181 | A | 5/2015 |
| RU | 2143812 | C1 | 1/2000 |
| SU | 1792308 | A3 | 1/1993 |
| WO | WO 0184941 | A1 | 11/2001 |
| WO | WO 2011/001143 | A2 | 1/2011 |
| WO | WO 2011/079946 | A1 | 7/2011 |
| WO | WO 2015/193544 | A1 | 12/2015 |

OTHER PUBLICATIONS

Search Report for Finland Application No. FI-20155968 dated Aug. 17, 2016, 2 pages.
Larsen, R, et al., *Low Salt Brining for Pre-Rigor Filleted Farmed Cod (Gadus morhua L.) and the Effects on Different Quality Parameters*, LWT 41 (2008) 1167-1172.
Rora, A. M. B. et al., *Salt Diffusion in Pre-Rigor Filleted Atlantic Salmon*, Aquaculture 232 (2004) 255-263.
Wang, D. et al., *Postmortem Changes of Cultivated Atlantic Salmon and Their Effects on Salt Uptake*, Journal of Food Science, vol. 63, No. 4 (1998) 634-637.
Russia Office Action with Search Report for 2018124243 dated Apr. 23, 2020 (12 pages).
Chilean Office Action with Search Report for 201801650 dated May 13, 2020 (19 pages).

\* cited by examiner

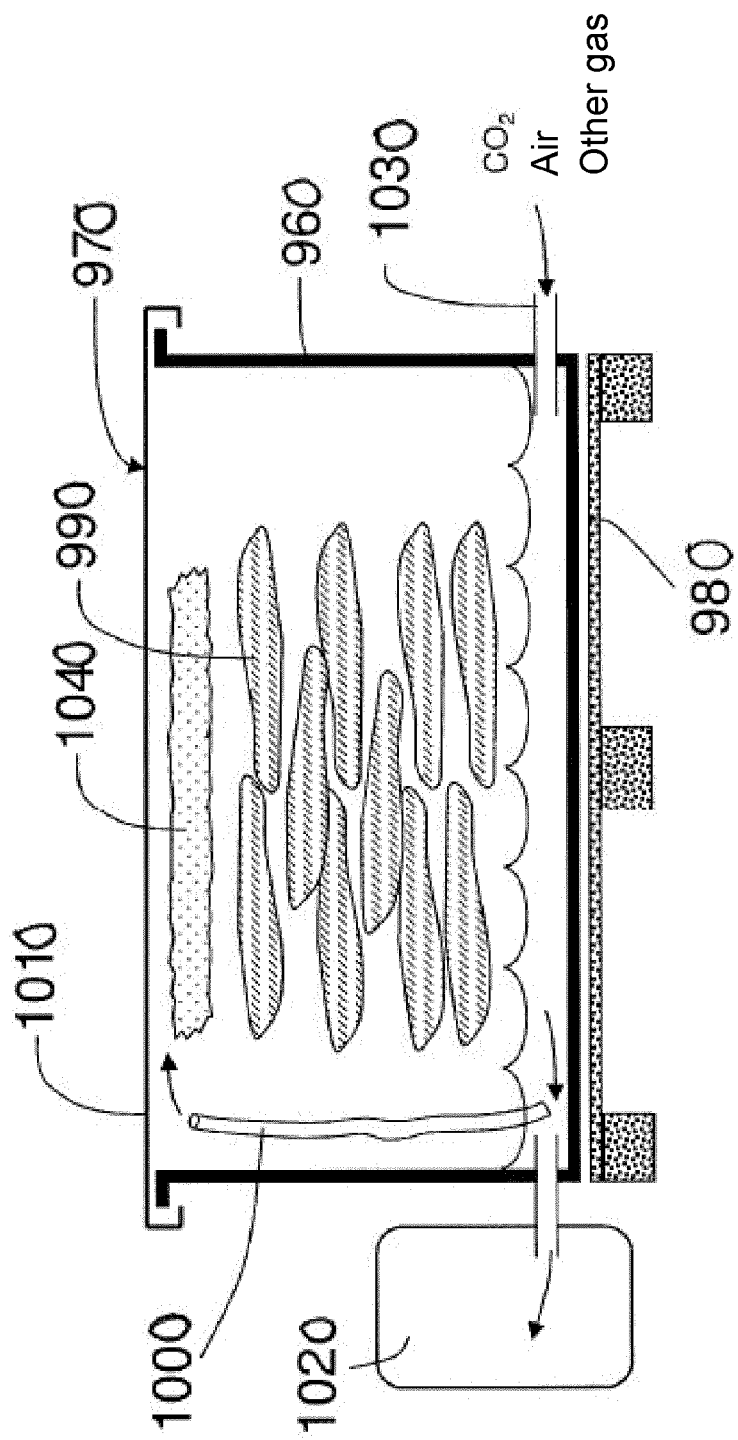

METHOD FOR PREPARING FISH PRODUCT

CROSS-REFERENCE TO RELATED APPLICATIONS

This application is a national phase entry of International Application No. PCT/FI2016/050885, filed Dec. 16, 2016, which claims priority to Finnish Patent Application No. 20155968, filed on Dec. 18, 2015, the entire contents of which are incorporated herein by reference.

BACKGROUND

The invention relates to a method for processing fish into food.

In the fish processing industry, fish are typically slaughtered at an entirely different location to where they are consumed; for instance, fish is produced in Norway and consumed in Central or Southern Europe. Because of this, the transport time for fish is long, typically 4 to 7 days. In addition, processing fish into a fish product for delivery to end-users, such as wholesalers, retail outlets, restaurants, or households, may take as many as 7 more days. The problem is that, after such a long period, it is not possible to prepare a high-quality fish product from such fish, due to factors such as uncontrolled autolysis caused by the enzymes in the fish meat.

BRIEF DISCLOSURE

The method behind the invention is characterised by what is stated in the independent claim. The other embodiments of the invention are characterised by what is disclosed in the rest of the claims.

The idea is that, using the presented method, the slaughtered fish is filleted in its pre-rigor state, skin is removed from the fillet in the pre-rigor state, the skinless fillet is arranged in a pre-salting process in the pre-rigor state and allowed to remain there for the pre-salting period, the fillet is removed from the pre-salting process, the fillet is arranged in its transport package, in which it is subjected to a second salting process, and the fillet is allowed to remain in the transport package for at least one day.

The advantage of this is that autolysis is brought under control, as a result of which the degradation in the quality of the fish product due to autolysis can be substantially reduced. In this description, autolysis refers to the proteolysis caused by enzymes in the tissue of the fish, which begins immediately after death. Uncontrolled autolysis unfavourably affects the sensory properties of fish: taste, smell, colour, and structure. Uncontrolled autolysis also promotes the microbiological deterioration of the fish by producing peptides and amino acids that bacteria use as nutrients.

Inventive embodiments are also disclosed in the specification and drawings of this application. The inventive content of the application may also be defined differently than in the claims presented below. The inventive content may also consist of several separate inventions, particularly if the invention is examined in the light of disclosed or implicit subtasks or from the point of view of gained advantages or groups of advantages. In such a case, some of the definitions in the claims below may be irrelevant to the separate inventive ideas. The features of the different embodiments of the invention may be applied to other embodiments within the scope of the basic inventive idea.

LIST OF FIGURES

Figure 2:
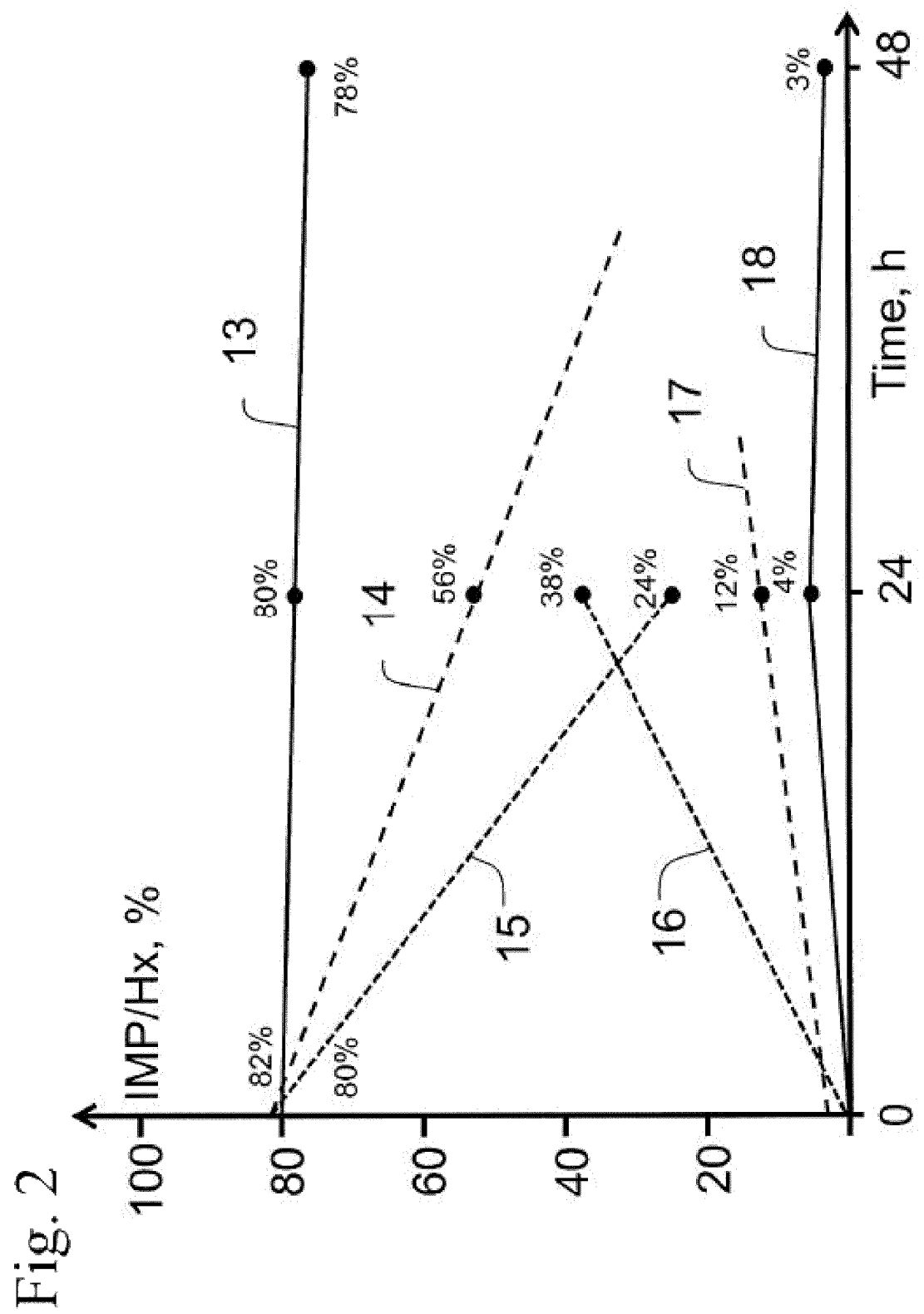
Figure 3:
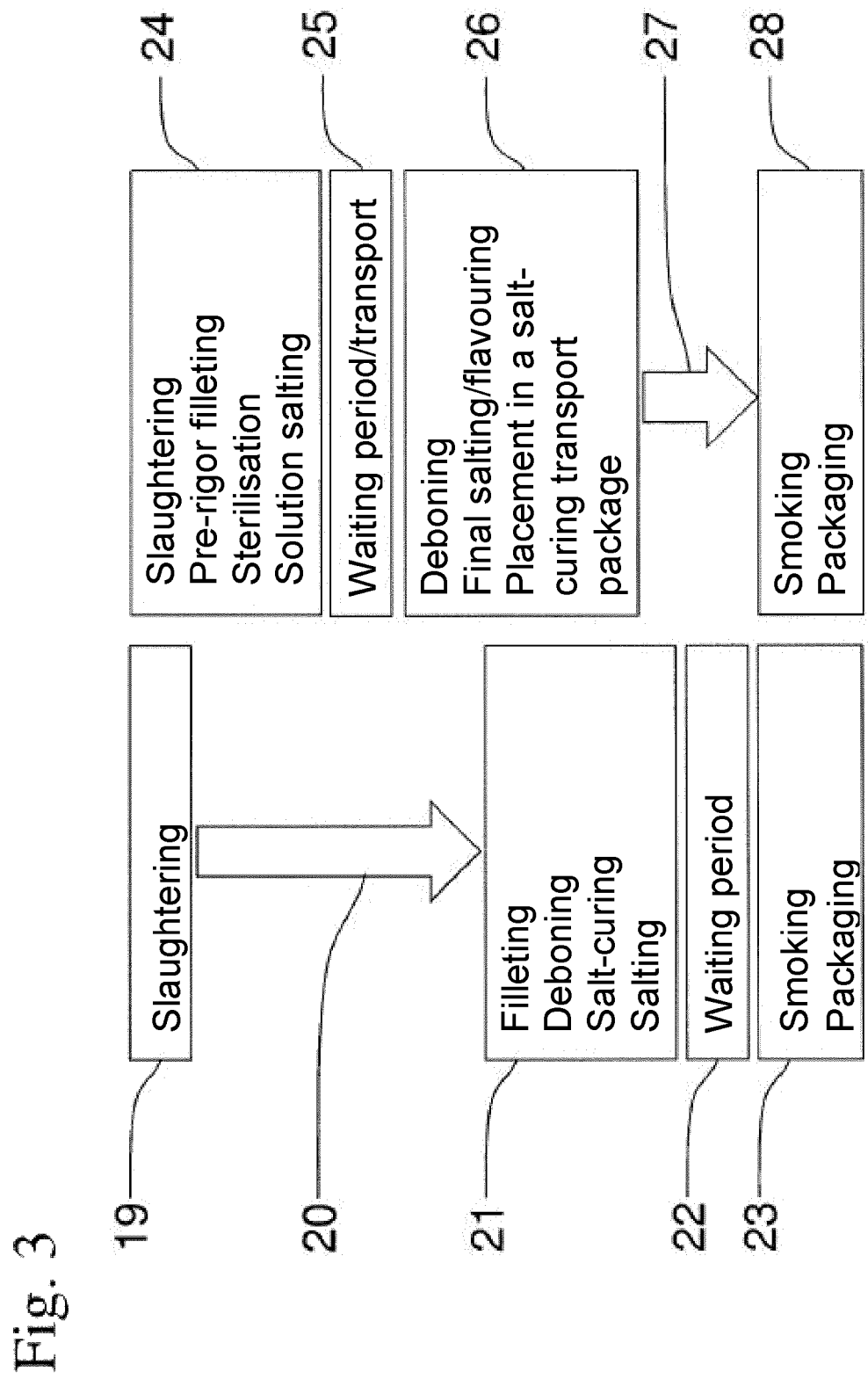
Figure 4:
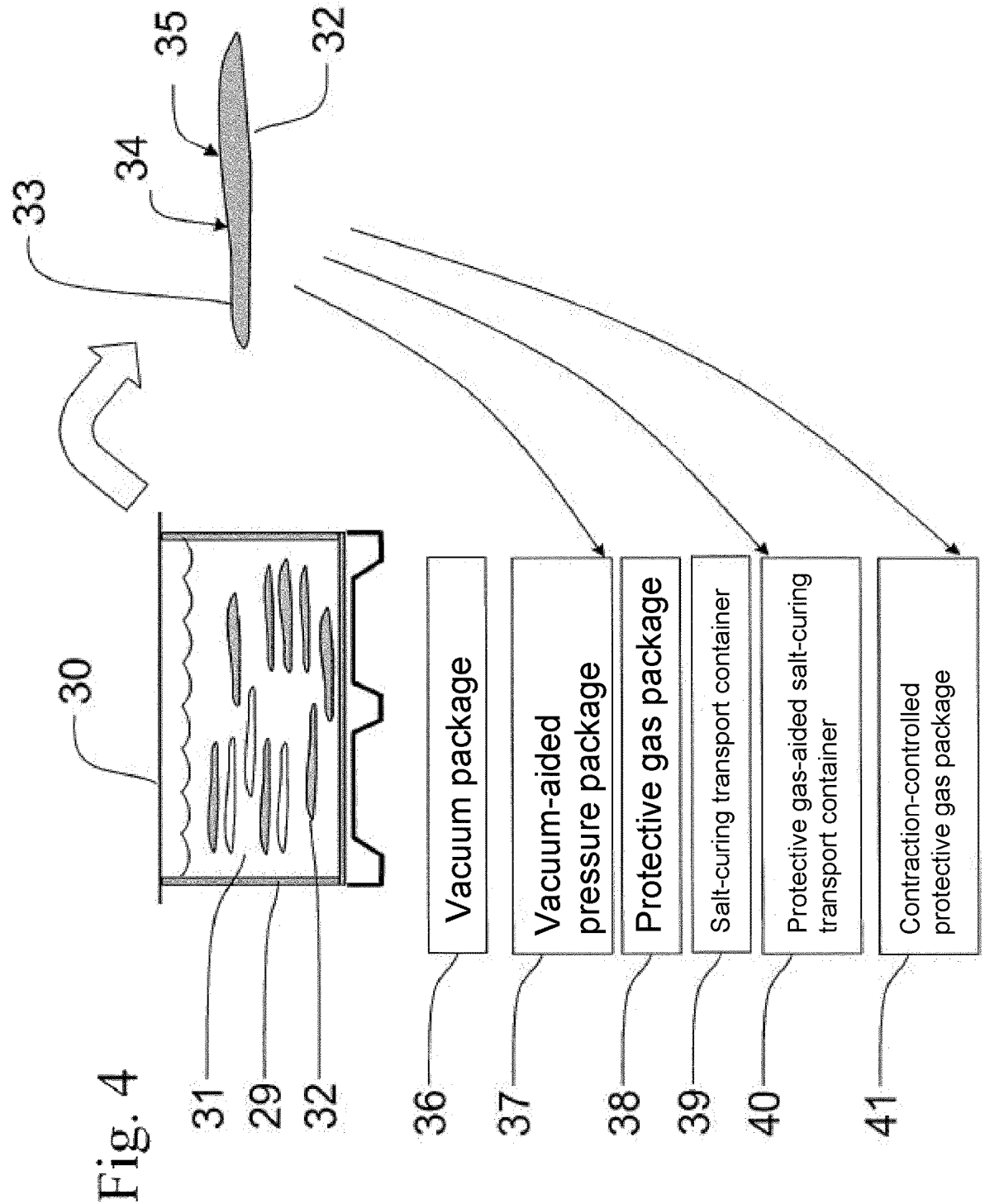
Figure 5:
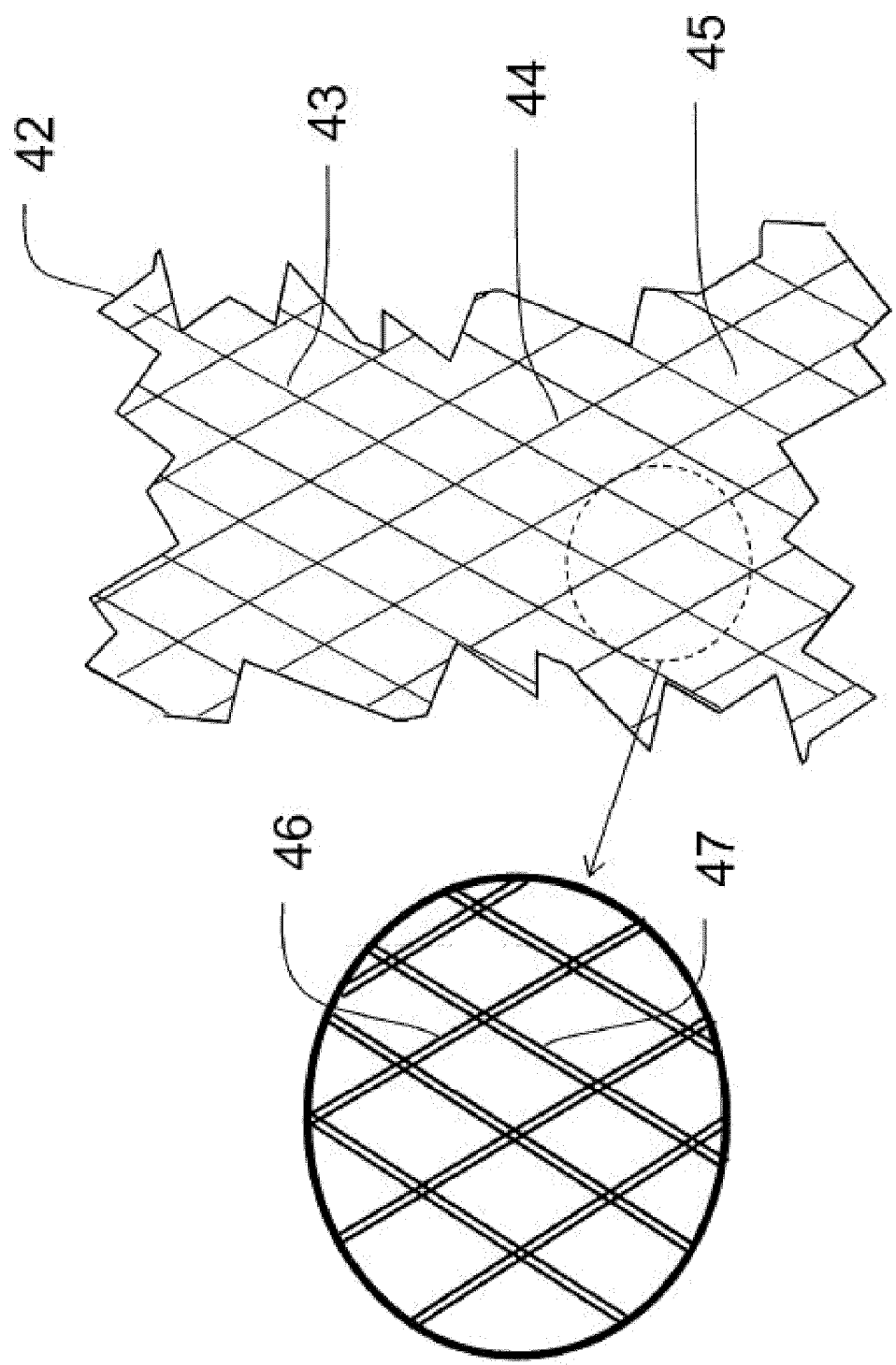
Figure 6:
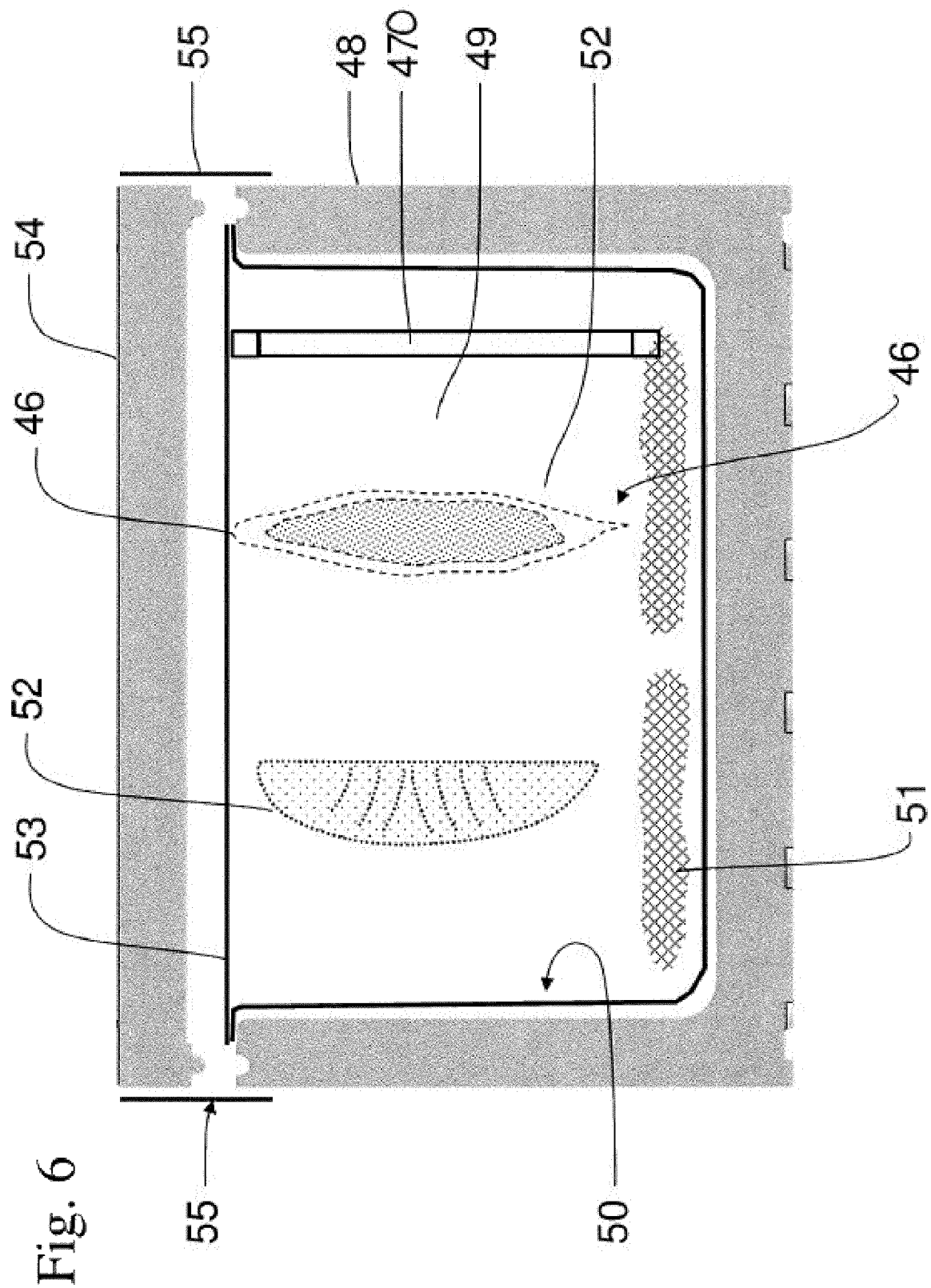
Figure 7:
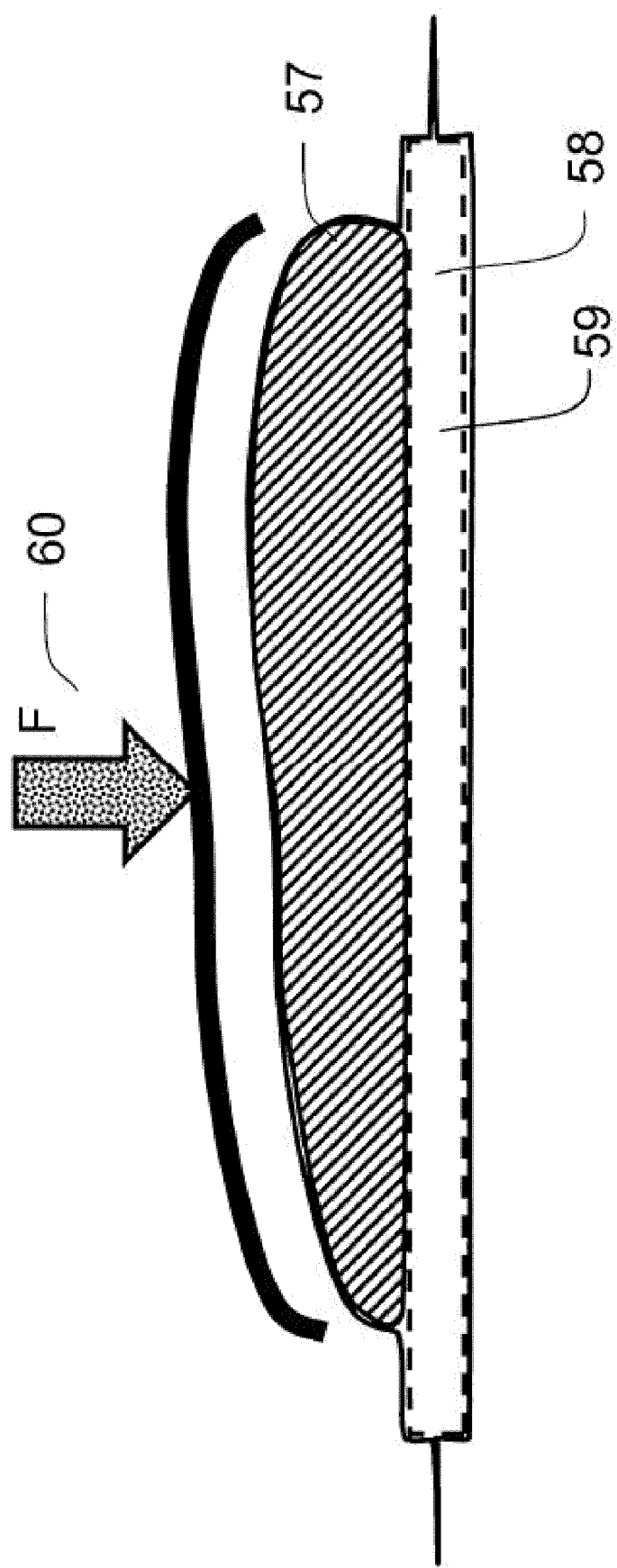
Figure 8:
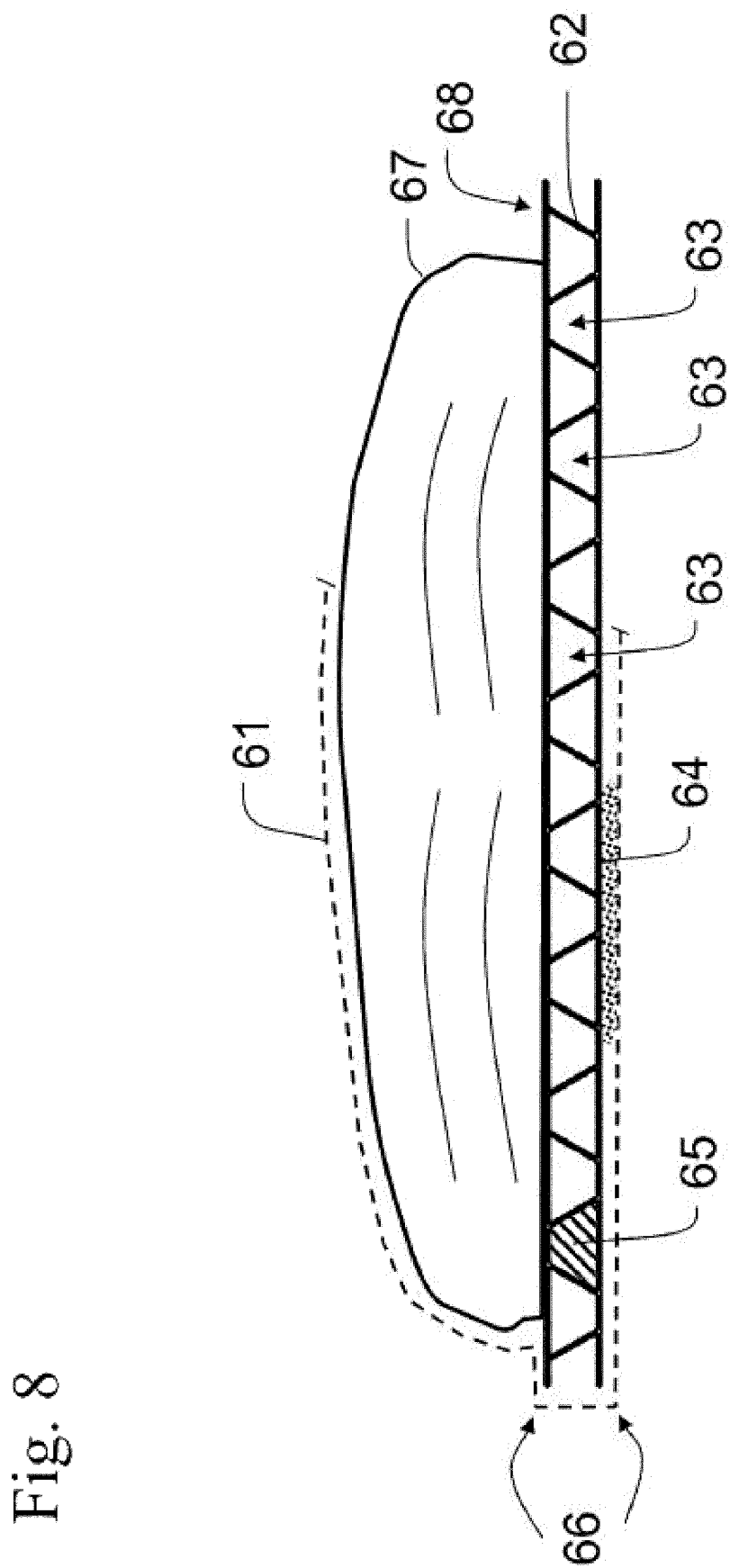
Figure 9:
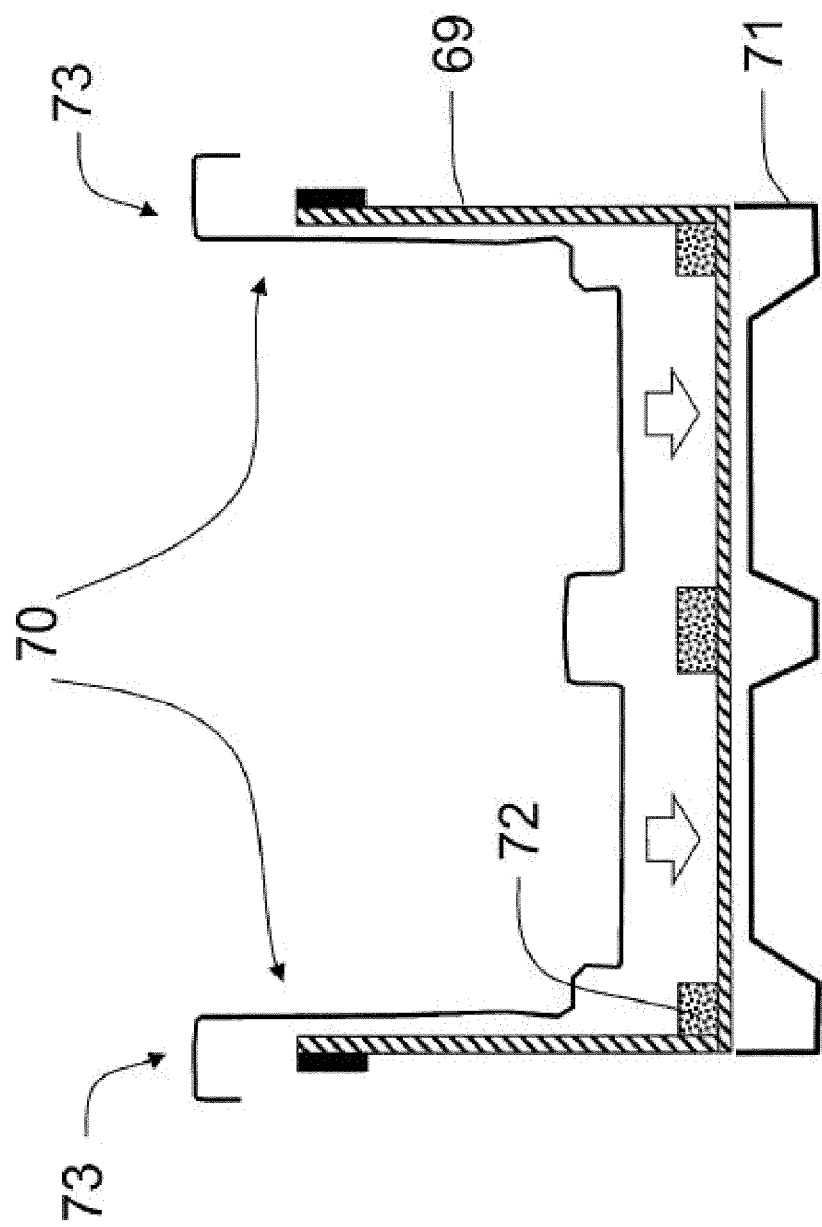
Figure 10:
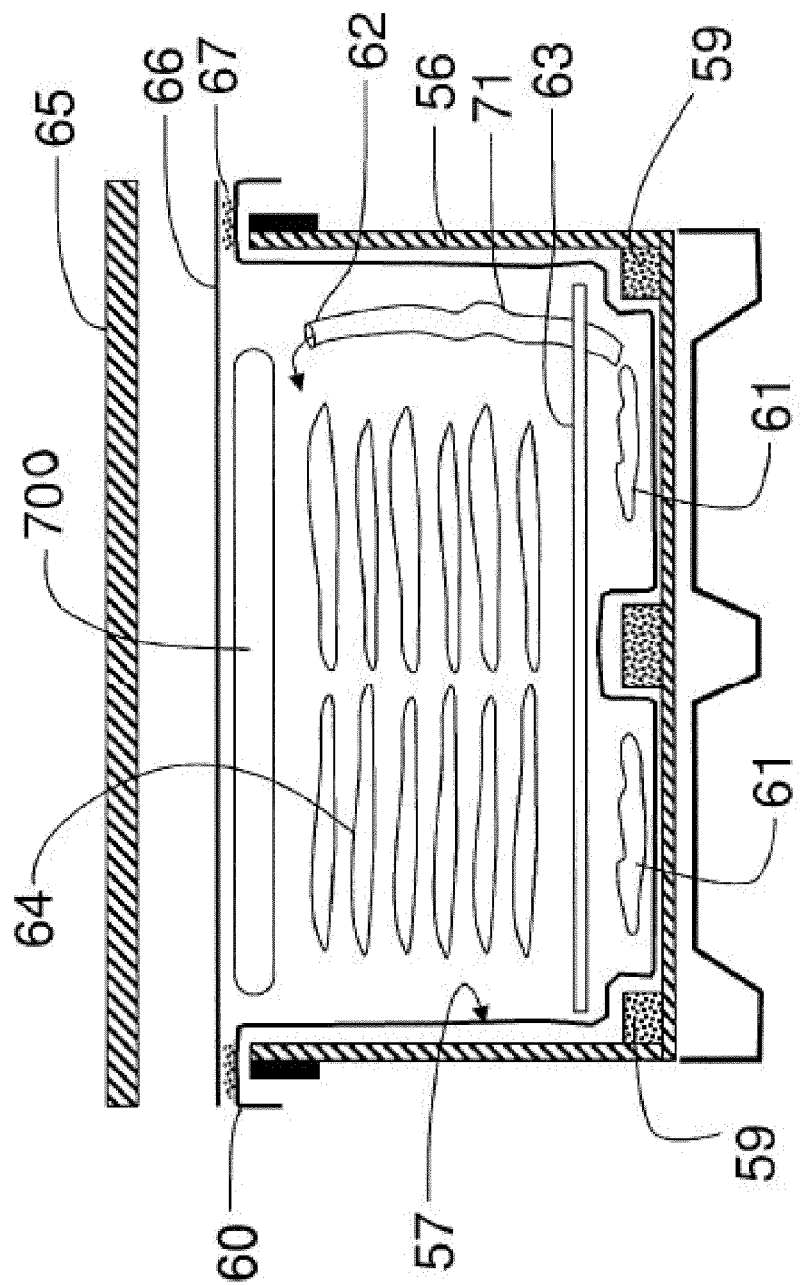
Figure 11:
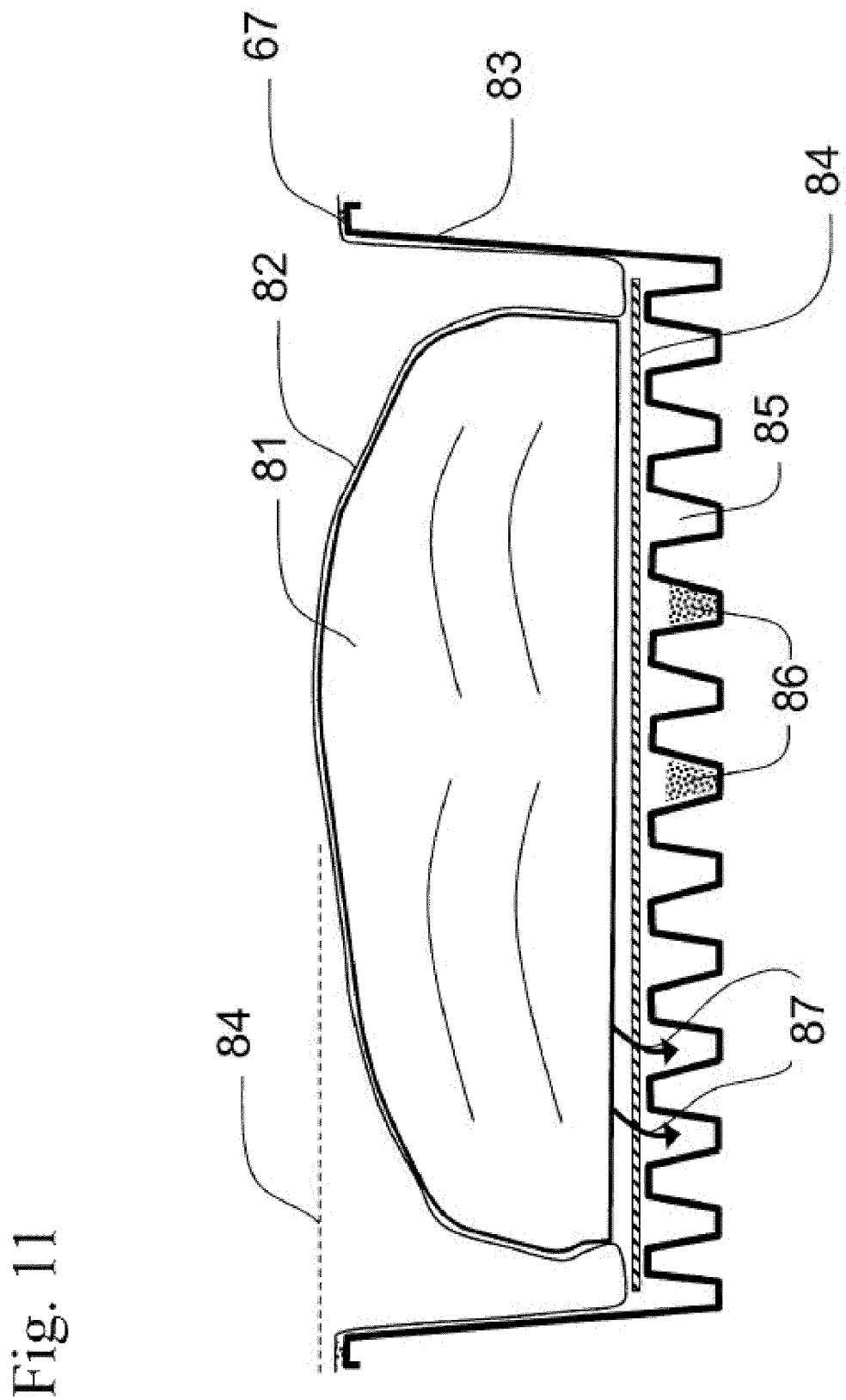
Figure 12:
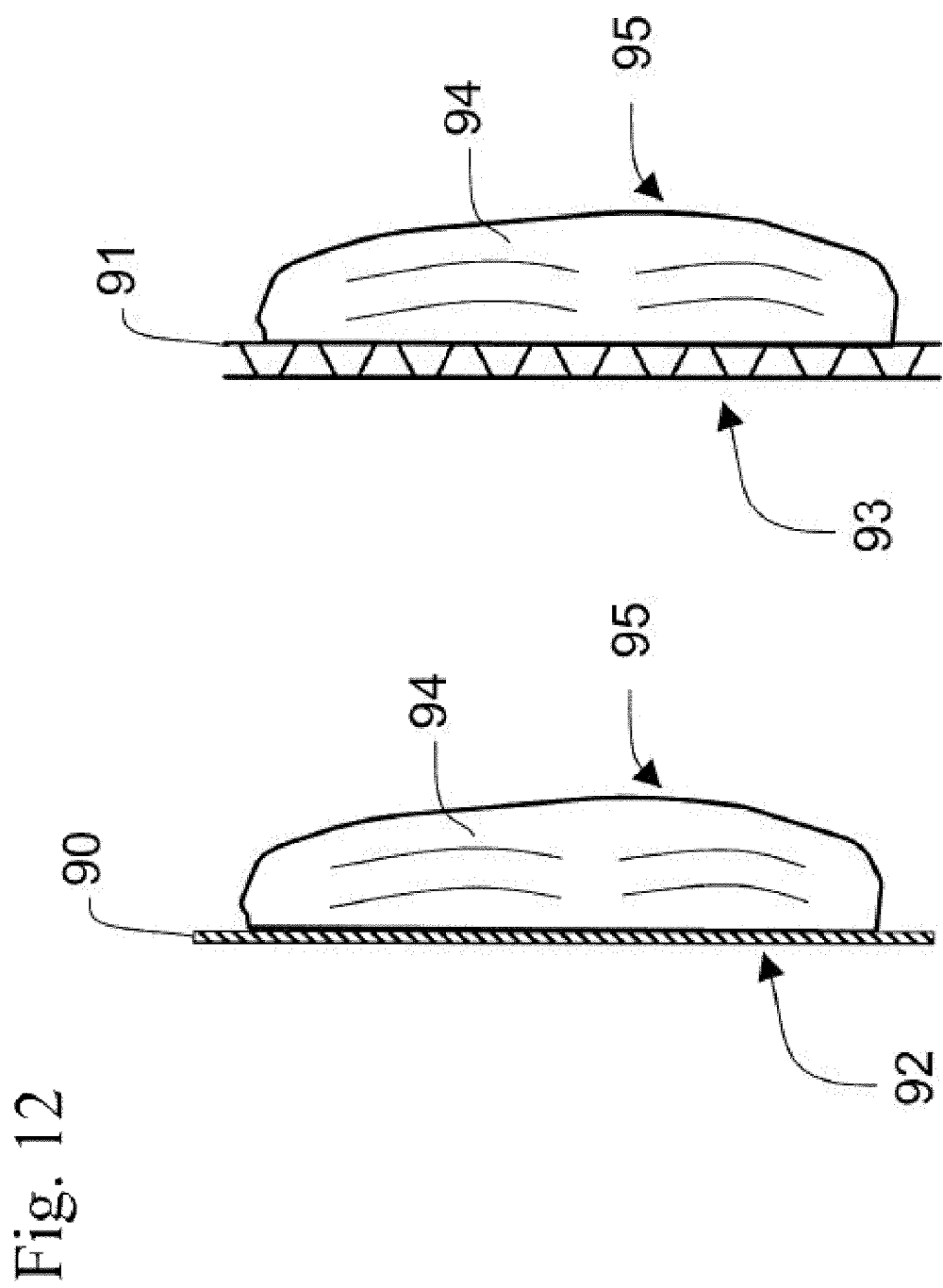
Figure 13:
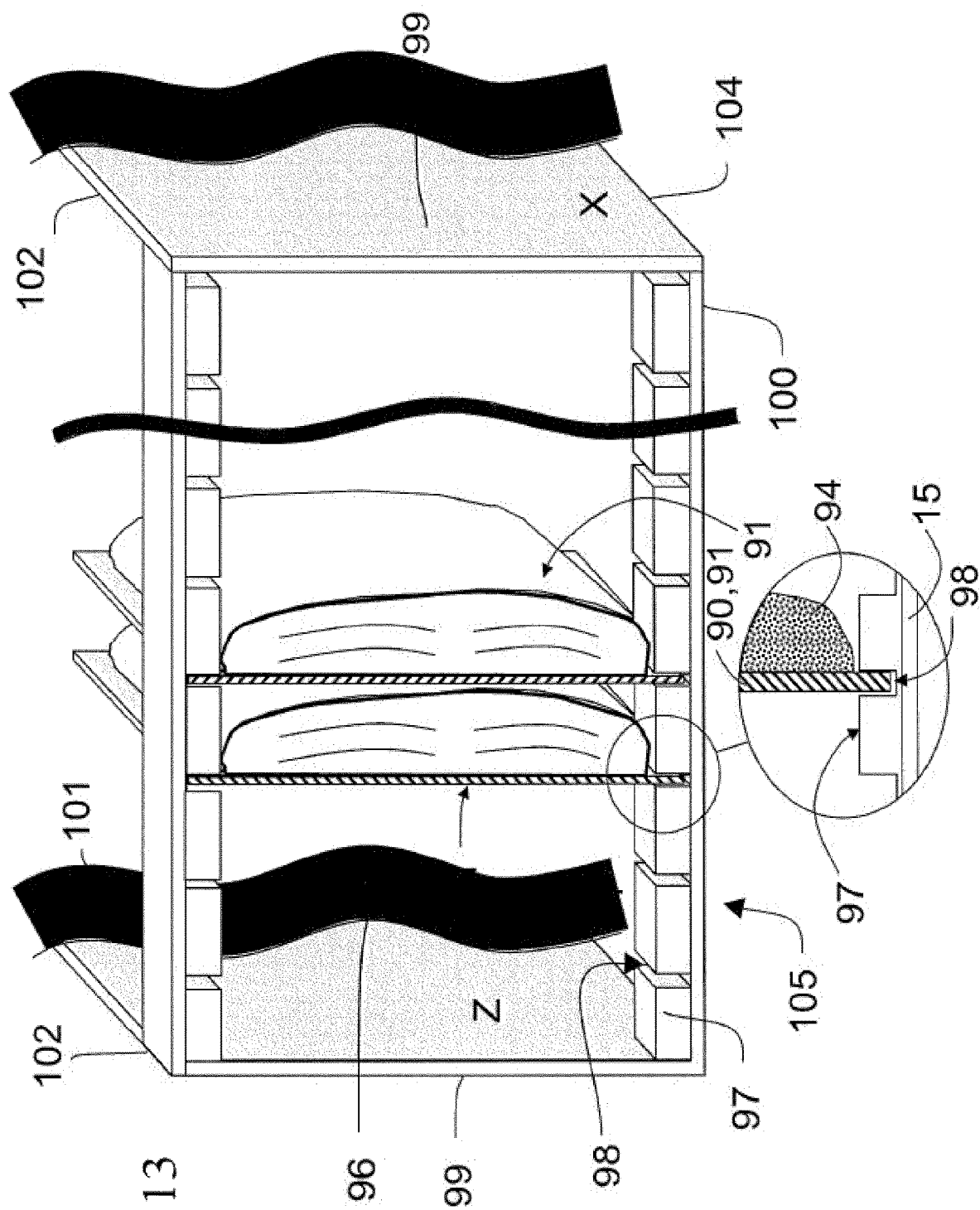
Figure 14:
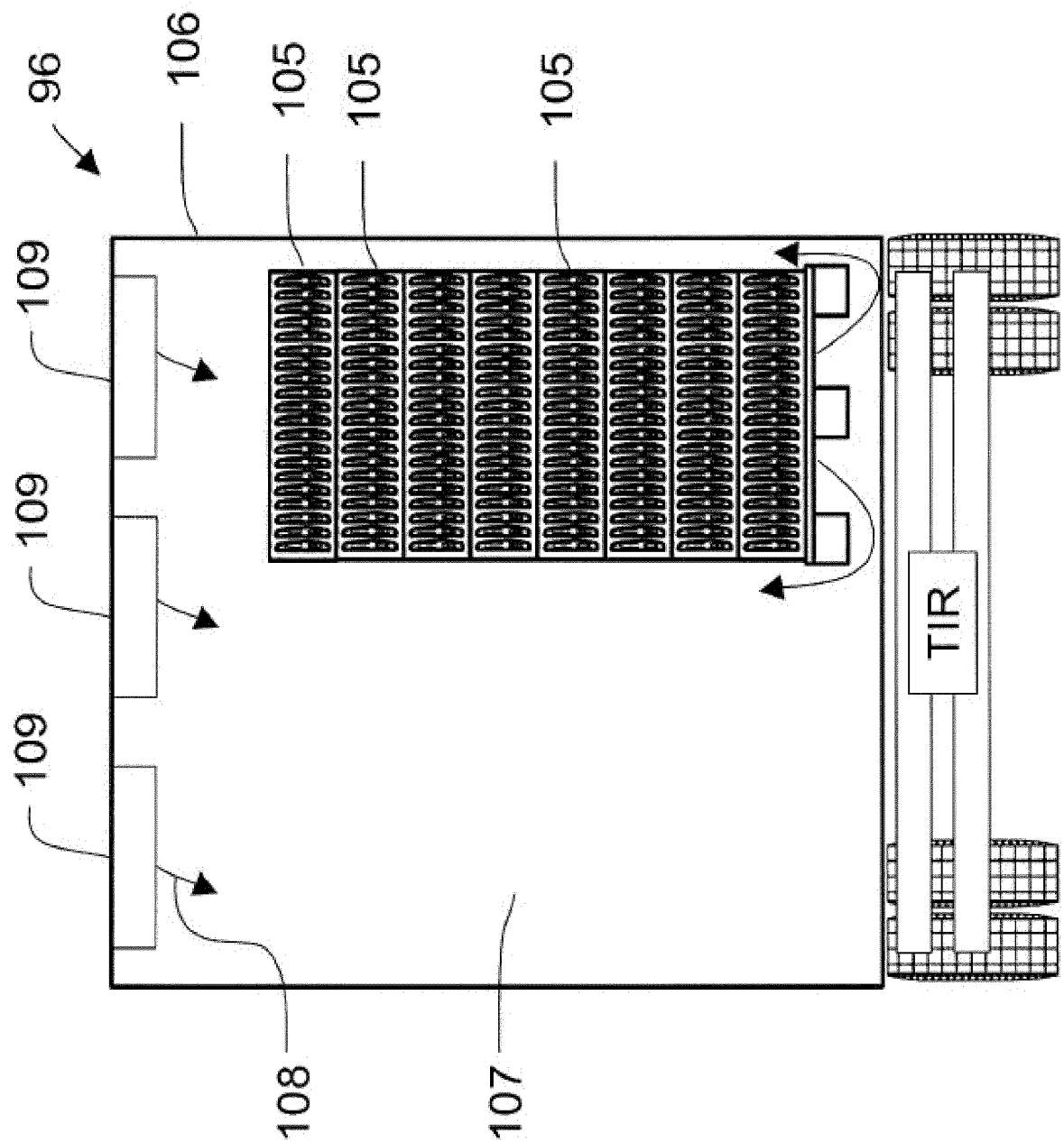
Figure 15:
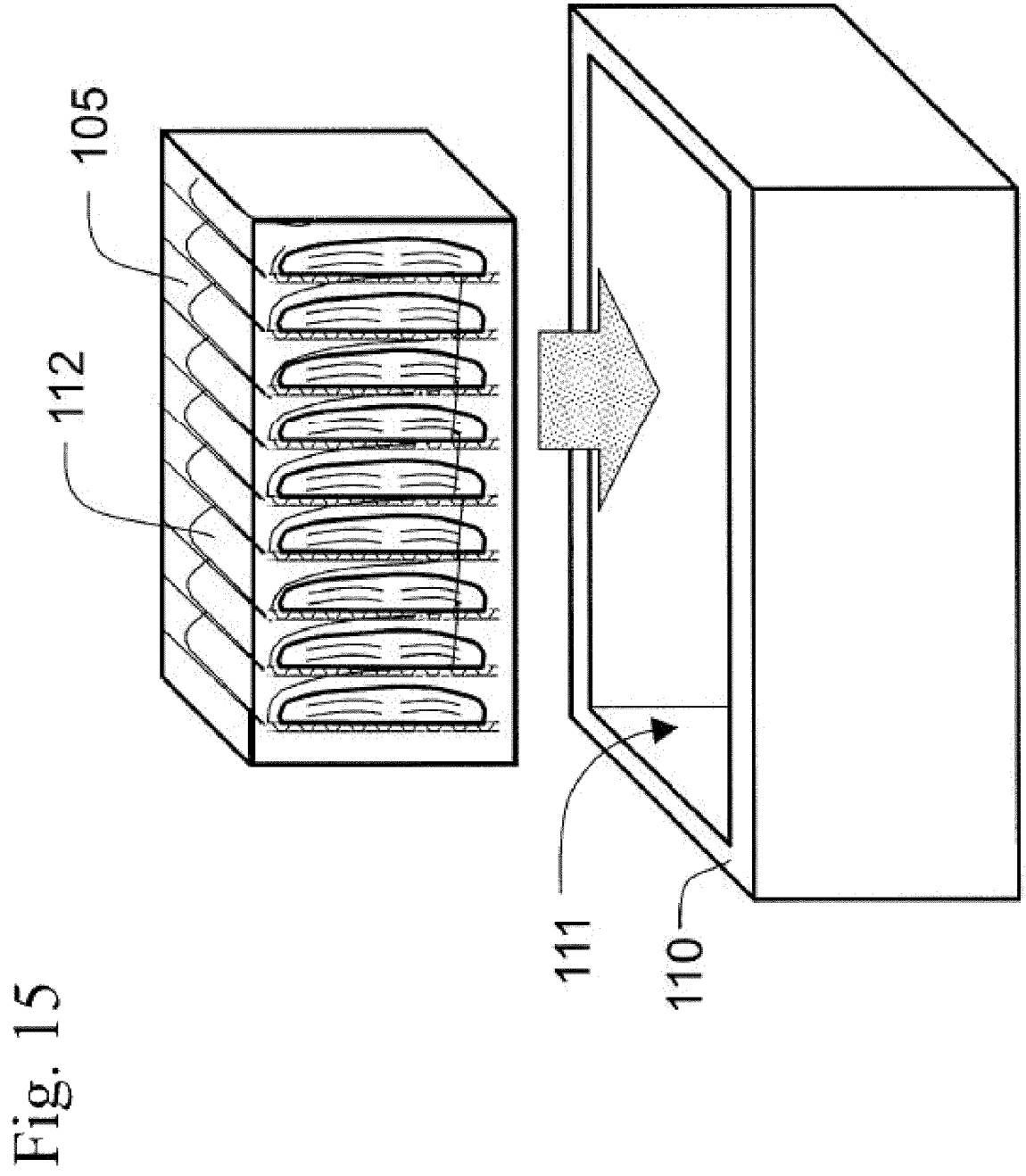
Figure 16:
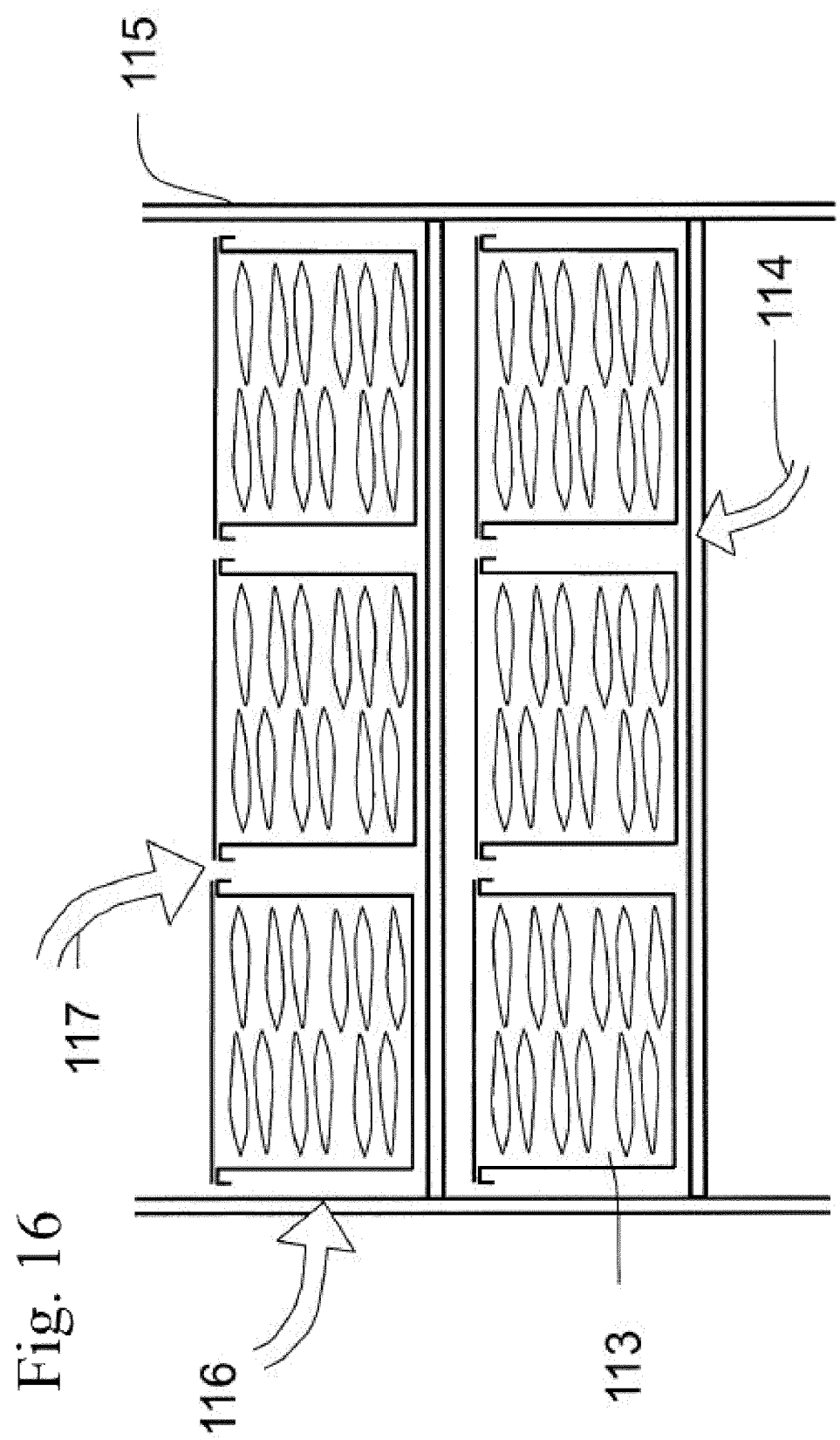
Figure 17:
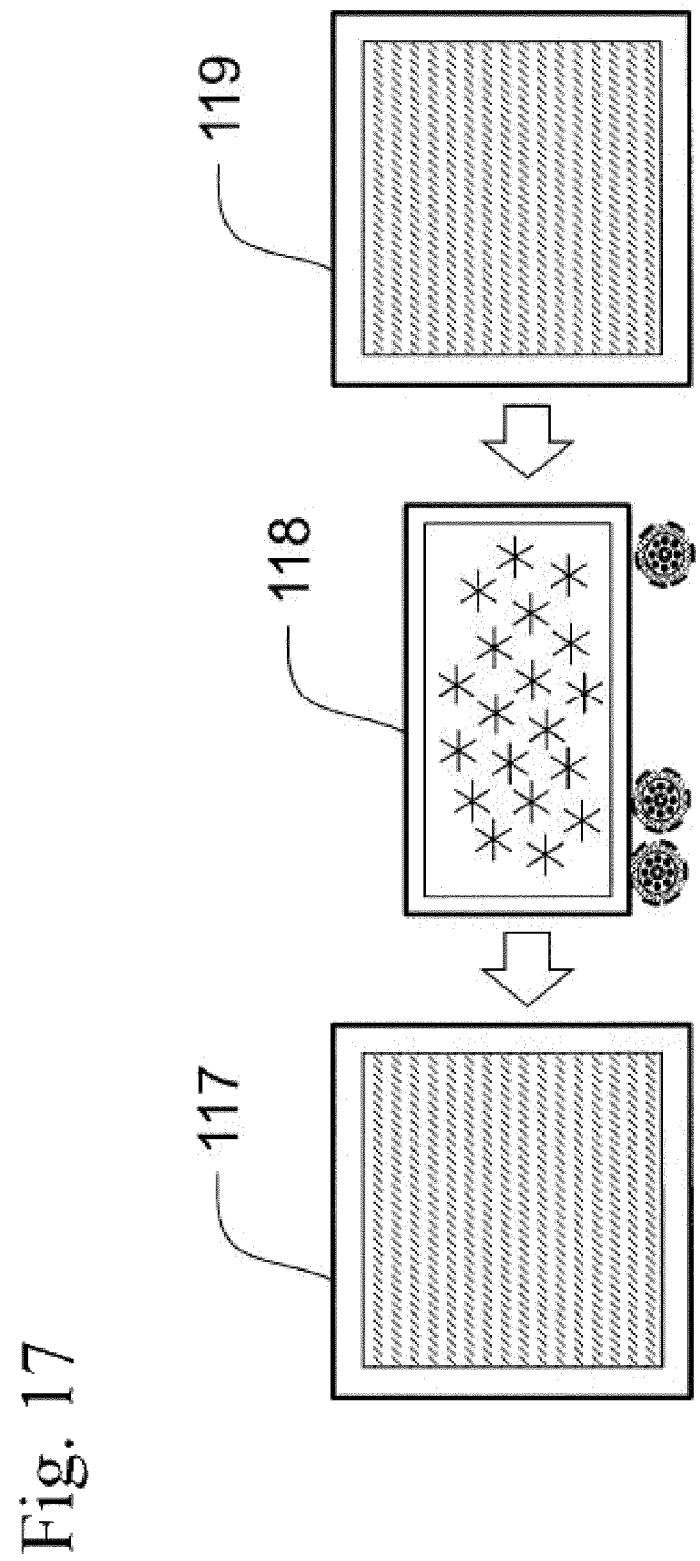
Figure 18:
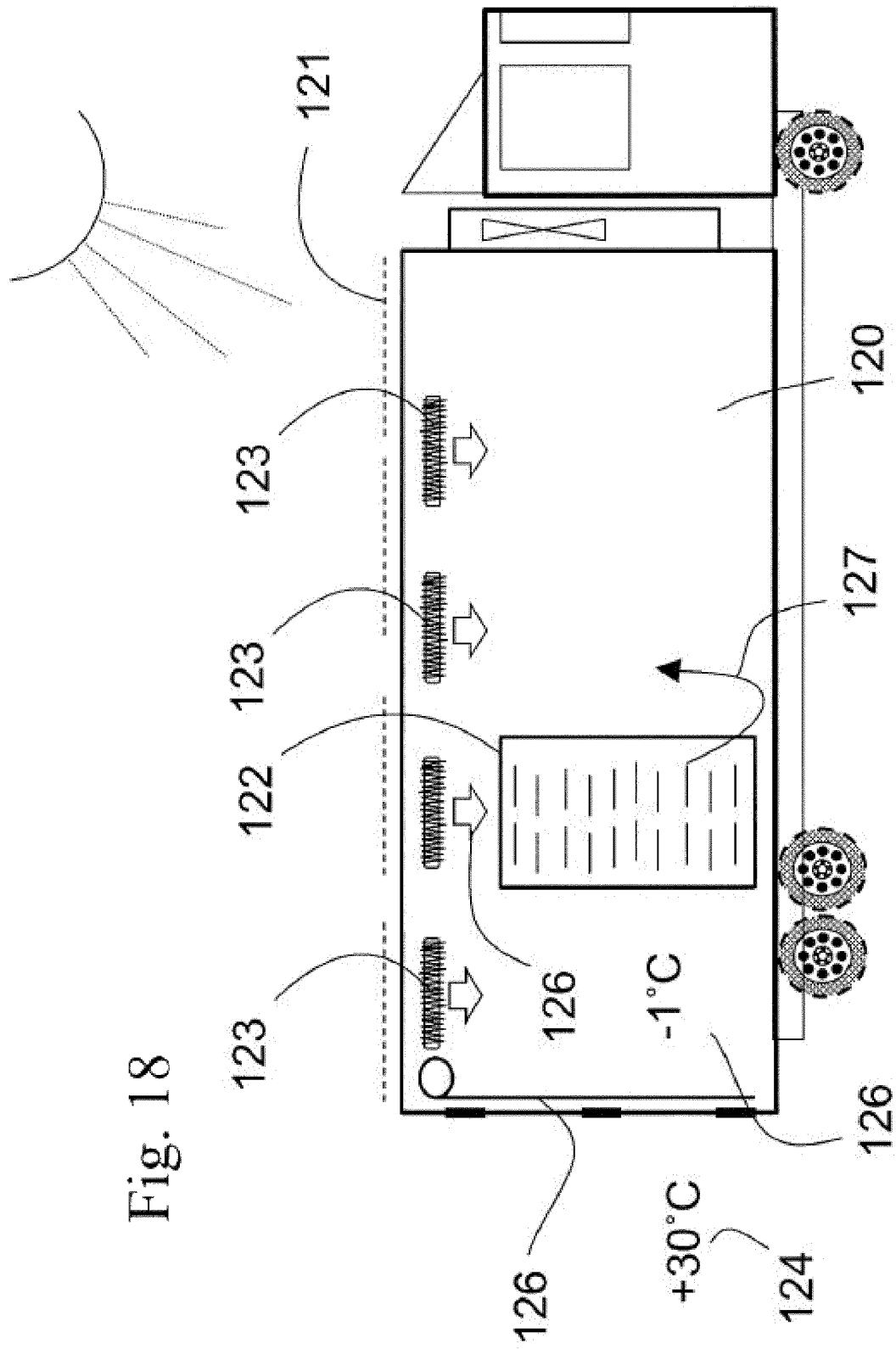
Figure 19:
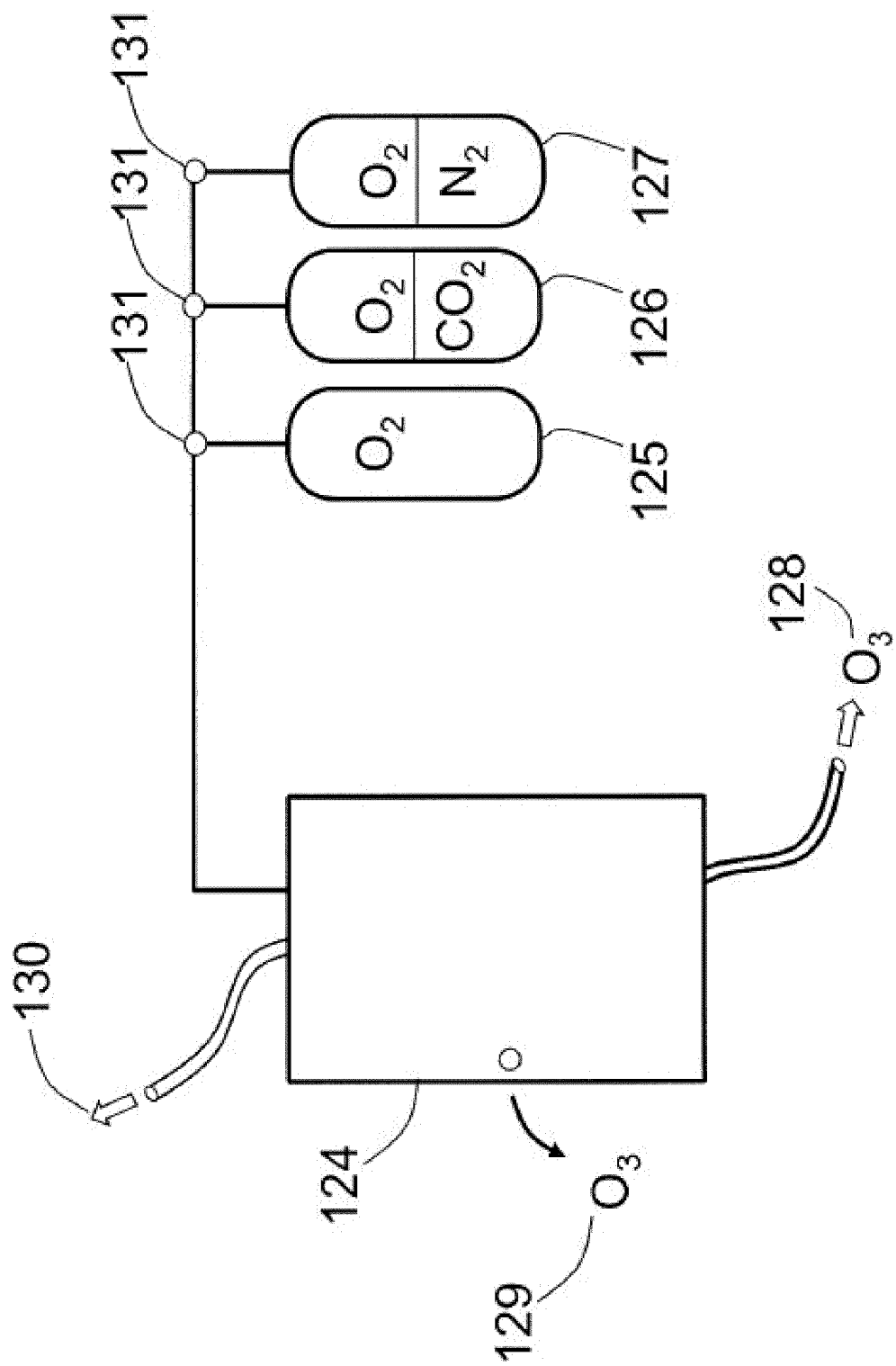
Figure 20:
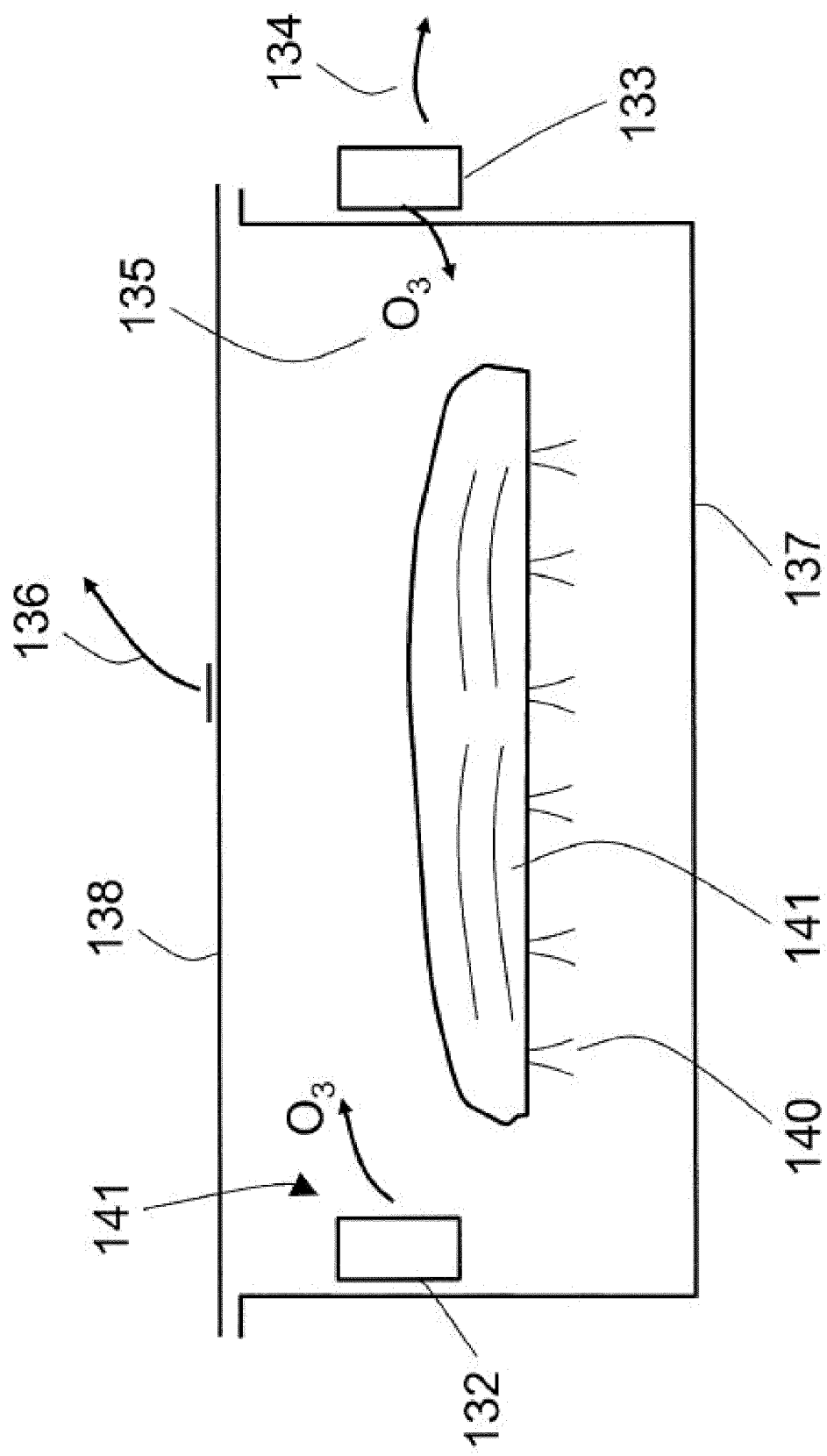

The invention is described in more detail in the accompanying drawings, in which FIG. 1 is a schematic representation of the method steps of an embodiment according to the method, FIG. 2 shows the quality of a fish product achieved by the method described in this description in comparison with previously known fish products, FIG. 3 shows a comparison between a known method and an embodiment of the method according to the present invention, FIG. 4 is a schematic representation of some packaging formats, FIG. 5 is a schematic representation of a means intended to control the contraction of a fillet, FIG. 6 shows an embodiment of a storage and/or transport container as a schematic cross-sectional view, FIG. 7 shows an embodiment of a pressure package as a schematic side view, FIG. 8 shows a pressure package as a schematic cross-sectional view, FIGS. 9 and 10 show a salt-curing transport package as a schematic cross-sectional view, FIG. 11 shows an embodiment of a small package as a schematic side view, FIG. 12 shows a known package and a new package, FIG. 13 shows an embodiment for positioning packages shown in FIG. 12, for instance, into a storage and transport container, FIG. 14 shows an embodiment of arranging containers shown in FIG. 13, for instance, in a transport space, FIG. 15 shows an embodiment of using a container according to FIG. 13, for instance, FIG. 16 shows an embodiment of the method for transporting and storing protective gas packages, FIG. 17 is a schematic representation of an embodiment of the method, FIG. 18 shows a cold-storage vehicle with fish fillet packages positioned in its cold storage space, FIG. 19 shows an embodiment of the method that utilises a novel type of MAP package, FIG. 20 shows an embodiment of a package, and FIG. 21 shows an embodiment of the invention.

For the sake of clarity, the figures show the invention in a simplified manner.

DETAILED DESCRIPTION

FIG. 1 shows the most essential method steps of an embodiment of the method in general.

After the fish is slaughtered 1, it is filleted 2 as soon as possible and in any case while the fish is still in pre-rigor state.

During filleting 2, it is also possible to trim the fillet, i.e. form a fillet of a desired shape. In this context, it should be noted that the term "fillet" refers herein to a fish flank without the backbone, with the flesh intact on both sides of the bones.

After filleting 2, the skin 3 is removed from the fillet, and preferably also the dark meat under the skin.

According to one approach, the '110' attachment of the bones to the fillet flesh is affected. The attachment mechanism of the bones can be affected in many ways when the fish fillet is skinless: for example mechanically, electrically, thermically, chemically, or by a combination of these. At best, effect 110 essentially targets the area of the bone rather than the entire fillet.

Affecting bone attachment through 110 can be implemented, for example, by the following means: (a) cutting the end of the bone away with a blade, (b) targeted electrical stimulation, (c) a precise, targeted thermal shock, for example with a laser, (d) injecting salt or a suitable enzyme in the vicinity of the bone, (e) a targeted ultrasound pulse or other vibration, (f) a high-pressure water jet that may be pulsed, or a combination of these.

According to one idea, affecting 110 the bone attachment does not remove the bones; rather, the bones are not removed until after the pre-salting process, once the salt (NaCl) has had time to affect the area around the bones.

According to an idea, at the latest after the removal of the skin, the fish meat is subjected to antibacterial treatment 4. Antibacterial treatment 4 may comprise ozone treatment in gaseous or liquid form, such as water, dissolved ozone ($O_3$), concentrated saline solution (salt content 8 to 33%), saline solution with ozone and/or hypochlorous acid (HClO) dissolved therein, ultra violet light, laser radiation, alcohol or a combination of the above-mentioned treatments.

According to an idea, the antibacterial treatment 4 comprises plasma treatment with either cold or hot plasma. Cold plasma treatment uses gas having only a small part, such as approximately 1%, of the gas molecules ionised, whereas in hot plasma treatment, the gas is ionised almost entirely. With the treatment, it is possible to destroy any adverse microorganisms on the surface of the fillet without substantially heating the fillet. It should be noted that in a fresh fillet that is prepared with the method described herein, microorganisms are on the surface of the fillet and can be destroyed before they enter the meat. A useful plasma treatment method is a method that goes by the tradename Openair® Plasma.

According to an idea, a washing/rinsing treatment of the fillet is combined with the antibacterial treatment. Further, the antibacterial treatment can be performed in such a manner that it contains a function that cools the fillet. For instance, the washing/rinsing water may be so salty that its temperature can be lowered to below zero.

According to an idea, the fillet is cooled immediately after filleting to a low temperature, preferably below 8° C., to approximately 0° C., for example. The cooling can be done using sprayable or dousable saline solution having a temperature of +8° C. to −20° C., for instance.

The above-mentioned work processes are performed as quickly as possible after slaughtering, within an hour, for example. The faster it is done, the better the quality of fillet can be achieved.

A skinless fillet is placed in a pre-salting process for 3 to 48 hours, for example, after which the bones are removed from the fillet.

According to an idea, in pre-salting process 5, a solution salting method is used, wherein the salt content of the solution is 1.5 to 33%, preferably 10% at most. In solution salting, the temperature of the fillet is below +4° C., preferably 0° C. or even lower. Salt typically comprises sea salt, i.e. sodium chloride (NaCl), but it may also comprise potassium chloride (KCl), for instance. It should be noted in this context, that the percentages (%) given in this description are percentage by weight, unless otherwise stated.

According to another idea, in pre-salting process 5, an injection salting method is used, wherein a 5 to 33% saline solution is injected into the fish meat.

Pre-salting 5 may last for 3 to 48 hours, for instance, but preferably 3 to 24 hours. During this time, the fillet may, for instance, be transported 6 closer to the end market.

According to an idea, the salting degree of the fillet after pre-salting is 0.5 to 4%, for instance.

Solution salting can be done freely, in which case the fillets are freely in the saline solution, or alternatively in such a manner that the fillets are in a controlled manner in the saline solution, stacked in a certain way, for example. In the embodiment mentioned last, it is possible to influence the contraction of the fillet by setting the fillets under pressure, for instance.

According to an embodiment, after the pre-salting 5, the bones are removed 7 from the skinless and pre-salted fillets. Bones can be removed by known bone removal machines. Thanks to the pre-salting 5 and skinlessness, the pulling force required to remove the bones is reduced to at least a third of the original force. For example, a typical pulling force of bones from a pre-rigor salmon fillet is approximately 1400 grams and is reduced to approximately 250 grams typically only after five days. Thanks to pre-salting 5, the pulling force is approximately 250 grams in less than 24 hours as salt weakens the adhesion of the bone.

According to another embodiment, bones are only removed at a later stage, after the fillet has been taken out of its transport package.

According to an idea, a skinless and pre-salted fillet can be treated before the removal of the bones by electrostimulation 12, with which the transfer of the fillet into post-rigor state and/or the removal of the bones can be speeded up.

After the bones have been removed 7, the fillet is a skinless and boneless initially-salted fillet. The fillet is also as bacterially clean as possible or even sterile. The fillet may also be trimmed to its final form. It is only at this stage decided, which final product will be prepared from the fillet. A salmon fillet can be prepared into salt-cured salmon or a cold-smoked salmon fillet.

It should be noted in this context that no sugar or other spices are used in pre-salting 5. Any required spices are added to the fillet only at spicing step 8, which is just before packaging 9 and transportation 10 to the destination, which is a fish processing plant, such as a smokehouse, wholesaler or retail outlet, restaurant, or private customer. Said spices may be sugar, pepper, dill, dry salt and/or any other spice known per se. It is also possible to add aromatic oil or alcohol.

Even though no salt was added in the spicing step 8, a certain part of the salt used in the pre-salting 5 will remain. Therefore, the fillet is in a second salting process, which is a dry-salting process, during transport 10. In other words, the fillet is salted in a two-step salting process, in which it is in the solution salting process during pre-salting 5 and in the dry-salting proves during transport 10. Solution salting prevents or at least substantially reduces the tendency of the fillet to contract. The dry-salting process drains water from the fillet, which improves the hygiene level and general quality of the fillet. In addition, the dry-salting process enhances the absorption of the spices into the fillet.

During packaging 9, the fillet is packed into a package that may be a protective gas package (MAP), vacuum package, pressure-aided vacuum package, mechanical pressure package with protective gas, or antibacterial ozone package/transport system, or some other suitable package. These package formats are described in more detail below.

According to an idea, during transport, the temperature is in the range of −5° C. to +4° C., preferably 0° C. or even lower, i.e. "super-chilled", which refers to a temperature range of −1.5° C. to −4° C. The super-chilled state is achieved in such a manner, for instance, that the fillet is cooled quickly, whereby part of the fish meat freezes on its surface to a depth of 1 mm, for example, or in such a manner that small ice crystals form in the fish meat. The cooling needs to be efficient and fast, because otherwise large ice crystals form and they destroy the meat completely. To reach the super-chilled state, cooling tunnels having a temperature of −60° C. are typically used.

According to an idea, while the fillet is in its transport package in the second salting process, the process liquid formed in the package is recovered so that it cannot affect the quality of the fillet in any way. This is done, because the process liquid contains dissolved proteins and other muscle residue that affect adversely the quality of the fillet.

According to an idea, the fillet is in its transport package under pressure, when the fillet is cured, which corresponds to a dry-salting process. The pressure may be a weight of 2 kg for the fillet, for example, when salt-cured salmon, salt/sugar salmon or raw material for cold-smoked salmon, for instance, is made. The pressure enhances water drainage from the fillet, whereby the correct texture is achieved in the meat, when it arrives at its destination. At the same time, it is ensured that the meat is bacteria-free, because water activity in the meat is less than 0.90 $a_w$.

FIG. 2 shows the quality of a fish product achieved by the method described in this description in comparison with previously known fish products. Herein, a measuring system of the French company, NovoCib, is applied to the measurement of the freshness of the fish product. Said measuring system has been disclosed in publication Journal of Food Science-Volume 63, No 4, 1998, pages 634 to 637, D. Wang et al. "Postmortem Changes of Cultivated Atlantic Salmon and Their Effects on Salt Uptake".

Reference numbers 13 and 14 show the IMP (Inosine Mono Phosphate) measurements on the fillets that are taken from the same fish, but from opposite halves. IMP indicates the freshness of the product in such a manner that the higher the number, the fresher the product. Said fish is a 6 kg farmed salmon from Norway and represents one of the best qualities in the world from a farmer that supplies sashimi-quality pre-rigor salmon fillets to Japan.

Reference number 13 represents a fillet made with the method described in this description, whereas reference number 14 represents a fillet made with a previously known method.

As shown in FIG. 2, the difference in IMP values is significantly in favour of the method described in this description, because the IMP value 13 of the fillet made with it is 80%, whereas the IMP value 14 of the fillet made with the previously known method is only 55%, as measured 24 hours from slaughter. The difference only increases with time.

Hypoxanthine (Hx) values also show a clear difference in favour of the present method. Reference number 18 represents a Hx measurement of a fillet made with the method described in this description, whereas reference number 17 represents a fillet made with a previously known method. Both fillets are of the above-mentioned highest possible quality.

The Hx value 18 of the fillet made with the present method remains constant at a range of approximately 4% during 48 hours, and actually considerably longer as long as the temperature is sufficiently low, such as 0° C.

Instead, the Hx value 17 of the sashimi-quality fillet made with the known method has already risen to 12% during the first day and exceeds 40% after 14 days.

In the above-mentioned measuring results, the raw material was a premium-quality salmon farmed with special diets and a fish density of less than 10 kg/m3 water.

In farming a normal-quality open water salmon, the fish density in the pool is approximately 25 kg/m3 water and, in closed pools, the density may be even 150 kg/m3 water.

Curve 15 represents the IMP value development and curve 16 the Hx value of a normal-quality fish that is typically sold in stores. As can be seen, the IMP value decreases during one day from 78% to as low as 24%. Correspondingly, the Hx value increase during one day from 0% to 38%. This is still pre-rigor quality, even though already after one day, the Hx value of the fillet is higher than the IMP value.

The above-mentioned method for preparing a pre-rigor fillet comprises the transportation of the fillet with skin and bones to its destination, in which case it transfers from pre-rigor state to post-rigor state within 4 days, for instance, after which the bones can be removed from the fillet by known methods.

When the fillet is transported to its destination in accordance with the new method, it transfers into post-rigor state in such a manner that the level of microorganisms, such as bacteria, the level of lactic acid and/or the Hx level do not increase significantly. For this to happen, according to an idea, the temperature of the fillet is close to 0° C. and the salt content is at least 0.7%, preferably 2%, for example.

A combination of temperature and salt content affects autolysis very effectively: for instance, a salt content of 3% and a temperature of −1.5° C. substantially prevent the effect of autolysis on fish meat. Autolysis can be slowed down, as shown by the new method, by means of a suitable amount of salt (over 0.5%, preferably 3%) and low temperature (e.g. −1° C. to +1° C.) in combination with filleting, skin removal, and pre-salting processes quickly after slaughter (e.g. one hour after slaughter).

FIG. 3 shows a comparison between a known method on the left and an embodiment of the method according to the present invention.

In the known method, the fish is slaughtered 19 and filleted in pre-rigor state, after which the fillet is placed typically with skin and bones intact into an insulated box with ice, and loaded into a transport vehicle as soon as possible. After this, the fillet is transported 20 at a temperature of 0° C. to +3° C. during 3 to 8 days to a fish processing plant, where first the bones are removed 21 from the fillet and the fillet is possibly salted typically with an injection salting method. The waiting time 22 is typically very short: usually cold-smoking 23, for instance, is performed immediately after injection salting.

The above-mentioned work processes are performed on a fillet with the skin intact. The skin is only removed if the fillet is sliced and packed in small packages.

A problem with the known method is that it does not act on autolysis in any way and the fish is transported as a pre-rigor fillet with skin and bones intact. Another known method comprises delivering the entire fish to its destination. This method does not act on autolysis in any way, either. In fact, most fish products are prepared at the destination country from an entire fish. The reason for this is that transporting a fillet is problematic, since it is much more sensitive to deterioration than an entire fish.

Extremely low IMP values, which are mainly below 25% and even have an average of 16%, are measured from typical cold-smoked and salt-cured salmon prepared by known methods.

Because the known methods do not act on autolysis immediately after slaughter, i.e. in pre-rigor state, autolysis becomes uncontrollable. The result is that the freshness of the fish disappears very quickly, as indicated by the rapid change in the IMP value.

In the method described in this description, first pre-rigor filleting 24 is done and at the same time at least the skin and preferably also as much as possible of the dark meat under it are removed. The skin, in particular, but also the dark meat promotes substantially the growth of microorganisms, such as bacteria, yeast and viruses, in the fillet.

Pre-salting helps in removing bones, because it softens the tissues surrounding the bones. If the skin is in place, salt cannot affect the root area of the bones, that is, the place right under the skin, where the bone attaches strongest to the surrounding tissue.

If a slaughtered fish was healthy and undamaged, its meat is substantially free from harmful organisms. However, harmful organisms can transfer to the fish meat from an external source, such as air, work machine, tools, human beings, fish skin, or process water.

The first measure is to control the time function, that is, the time from slaughter to the time when a skinless fillet is placed in pre-salting. The quicker things are done, the better the quality will be. According to an idea, this time is at most 24 hours, preferably less than 1 hour and even more preferably at most 15 minutes.

Another important measure is to keep the temperature of the fillet low, because the higher the temperature, the fiercer the contraction of the pre-rigor fillet and the stronger the reproductive and contamination capability of the foreign microorganisms. According to an idea, the temperature should not be higher than +12° C. during the filleting step, preferably as close to or even below 0° C., such as −1° C. to +1° C. Further, according to an idea, the temperature of the fillet must not be higher than the temperature during pre-salting.

In the next work phase 26, the fillet is taken out of pre-salting, after which, according to an embodiment, bones are removed from it using known bone removal machines, such as a machine in the Marel Pinbone Remover MS series. According to an idea, spices can be added to the fillet, the fillet can be salted by a dry-salting method, for instance. Finally, the fillets are placed in a selected package depending on what end product is to be prepared of the fillet. The package formats are described later in this description.

The next measure is transportation 27 to the destination. The transportation typically takes 1 to 8 days. According to an idea, the fillet cures without heating under the effect of controlled autolysis during transportation so that it is ready for processing at its destination. It should be noted that in this description the term "curing" refers to curing without heating, unless otherwise stated.

The method of the invention is not necessarily longer in time than the known methods.

According to an idea, the method of the invention contains the transportation of a fillet in such a manner that the fillet becomes ready for use for cold-smoking or as such for salt-cured fish at the destination, and the transportation takes 2 to 8 days. This time may include one day for pre-salting and the rest for the second salting process, i.e. dry-salting.

According to an idea, after the pre-salting process and the subsequent bone removal, the fillet is brought to a spicing step, in which spices, such as sugar, pepper, dill, salt or some other known spice or mixture of spices, are added to the fillet. However, the spicing step is not an essential method step.

The skinless and, according to an embodiment, boneless fillet undergoes dry-salting in its package during transportation 27—regardless of whether a spicing step took place or not or whether salt was added during the possible spicing step. The primary intention of the dry-salting process is to reduce the amount of water in the fillet. In the thus performed two-step salting process—pre-salting and dry-salting—the duration of the pre-salting process implemented by solution salting is typically 3 to 24 days, whereas the dry-salting process typically takes 1 to 8 days.

Since both salting steps can be performed while the fillet is transported, the new method is at least as fast as the known method in terms of transportation. The difference between the new and known methods is that in the known method, a "raw" fillet with skin and bones intact arrives at its destination, whereas in the new method, a skinless, boneless and cured fillet arrives at its destination.

FIG. 4 shows some packing formats with which the pre-rigor fillets can be transported from the preliminary process to the final process that takes place preferably close to the end-product markets.

For instance, fish may originate from Norway, where it has been slaughtered, filleted and placed into pre-salting 29. After this, the fillets can be transported to Sweden, for example, where the fillet 33 is taken out of pre-salting 29, its bones are removed, and it is possibly seasoned with salt, sugar, pepper, citric acid, dill, or some other known spice or combination of spices.

After this, the fillet is placed in a transport package that may be a vacuum package 36, vacuum-aided pressure package 37, protective gas package 38, salt-curing transport box 39, protective gas-aided salt-curing transport box 40, or contraction-controlled protective gas package/box 41. The fish fillet is transported in these package formats to its final destination, which is France, Italy, USA, or China, for instance.

According to an idea, the pre-salting takes place as solution salting in a tub or container 29 and at a low temperature, such as 0° C.±1° C. The contraction can then be well controlled, and a fast uncontrollable contraction does not occur in a mild salt solution of less than 8%. In addition, in the salt solution 31, the boneless and skinless fillets are, during this entire work phase, protected from microorganisms causing contamination. If the tub 29 is used as a transport container, it is preferably equip the tub 29 with a cover and to sterilise the free space between the salt solution 31 and cover 30 or to fill it with protective gas.

FIG. 5 shows a means intended for controlling contraction of a fillet that can be placed in a protective gas package (MAP, Modified Atmosphere Package).

The means presses the pre-rigor fillet with suitable force, which reduces the rate and/or intensity of contraction.

The means comprises a net-like structure 42 made of elastic material that is a sock-like construction in shape, for instance. Between the net-like material or its strands 46, 47, empty space 45 remains that is for instance 40% of the surface area of the means, most preferably over 50% of the surface area of the means.

The strands may be made of polymer material, for example. The means is elastic in structure. The enlarged figure shows how the strands of the net-like material may be joined together to form a uniform net-like means.

According to an idea, the fillet is placed on a hard underlay, for instance, and both the fillet and underlay are place inside the means. According to another idea, the means is arranged around the fish fillet without an underlay.

The fillet is place in the means preferably before the salting process. The means does not stop the penetration of salt into the fillet, nor does it prevent an antibacterial treatment or sterilisation of the fillet owing to its open structure. The means directs pressure on the fillet to prevent or at least essentially reduce the contraction of the fillet in pre-rigor state and during salting, in particular.

FIG. 6 shows an embodiment of a storage and/or transport container as a schematic cross-sectional view. A protective gas package 50, its inside space 49 filled with a desired protective gas, is placed in the storage and/or transport container 48. A liquid-absorbing pad 51 that produces carbon dioxide and/or citric acid when it becomes wet can also or alternatively be placed in the space.

The fillet 52 may be equipped with the pressing means shown in connection with FIG. 5, whereby the protective gas surrounds the fish fillet 52, which boosts the operation of the protective gas.

The pressing means may be an elastic net-like structure (as shown in the figure) or rigid, box-like structure, for example, which is substantially open on its sides and shaped in such a manner that the process liquid produced in the dry-salting process may escape from the vicinity of the fish fillet. According to an idea, an insulation box 48 may comprise protective films 50, 53 that form said protective gas package 50.

The box 48 may be heat-insulating or non-heat-insulating.

The pressing means allows fillets 52 to remain separate from each other. Furthermore, the pressing means allows fillet 52 to be hung from or attached to the inner walls of box 48 or a separate frame 470.

Box 48 may comprise a gas management system presented in FIG. 19. In this, stored gas such as carbon dioxide is fed into box 48, preferably from a gas management system inside it, or alternatively, oxygen is used which is fed into an ozonisation system that generates ozone inside the box. Preferably, the box is equipped with a valve, allowing the gas to be changed and new gas to be fed in to replace it.

Box 48 preferably has a separate cover part 54 that forms a tight 55 entity when connected to box 48.

Fillets with the skin intact can also be placed in box 48, because the fillets can be kept separate from each other, thus eliminating contamination between skin and meat.

FIG. 7 shows an embodiment of a pressure package as a schematic side view. Here, the fillet 57 is placed on an underlay 58. Air or protective gas between the film 60 and underlay 58 has been removed with a vacuum packaging machine, whereby negative pressure has formed inside the package to press the fillet 57. The negative pressure and pressing can be formed in the package, because the underlay 58 has an empty space 59 that does not compress even though air pressure surrounding the package is directed to it. The size of the pressing force may be 1 to 688 kg depending on the size of the negative pressure or, to be more precise, the difference in the pressures outside and inside the package.

The empty space 59 receives and also stores the process liquid from the fillet and generated during the salt-curing process, for instance. There may be 4 to 15% of process liquid based on the weight of the fillet. The empty space 59 is preferably dimensioned to be substantially larger than the estimated volume of liquid formed during the process.

The empty space 59 is positioned away from the fillet, i.e. the fillet is not in contact with the empty space 59 and the process liquid stored therein. Nothing reaches the fillet from the empty space 59, when the movement is always in the direction of the negative pressure, or away from the fillet.

FIG. 8 shows a pressure package as a schematic cross-sectional view. The fillet 67 is placed on an underlay 62 and both are surrounded by a packing film 61. When air is removed from inside the packing film 61 with a vacuum machine, negative pressure is formed in cavities 63 in the underlay 62, as a result of which the film 61 presses the fillet 67. The cavity 63 also serves as a storage space for the process liquid.

The underlay 62 may comprise on its surface grooves or holes 68 that facilitate the travel of liquid from the fillet 67 to the cavities 63 inside the underlay 62.

FIGS. 9 and 10 show as a schematic cross-sectional view a salt-curing transport package with a large number of fillets in the same space. The number of fillets may be more than 10, for instance, preferably more than 100, such as 400 fillets.

The frame 69 of the salt-curing transport package is a box-like solution made of wood material, such as plywood, which is placed on an underlay 71. Inside the frame 69, an inner package 70 is placed, which may be made of a plastic film, for example, and forms a sealed boundary layer. An edge 73 of the inner package 70 can be bent over the edge of the frame 69. According to an idea, supports or platforms 72 that remain outside the inner package 70 are arranged at the bottom of the frame 69.

FIG. 10 shows how an inner package 70 that forms a bag or inner trough is placed in the frame 69. Inside it, a plate 74 is arranged and fillets 77 can be placed on it on top of each other. The process liquid leaking from the fillets 77 accumulates at the bottom of the frame 69, which, according to an idea, holds an absorbing substructure 75 for liquid. This absorbing substructure 75 may be equipped with a $CO_2$ emitter which, when becoming moist, develops carbon dioxide gas or some other emitter of gas that improves the preservation of the product.

According to an idea, the bottom of the package is connected to the top of the box by means of a pipe 81, for instance, so that gas is also allowed to enter the space above the fillets 77.

After the package has been filled with fillets 77, it is advantageous to close it in an air-tight manner. This can be done by gluing, welding, or hot-soldering 80, for instance, the air-tight film 79 that closes the package to the inner package 70.

According to an idea, a gas-filled flexible element 700 is placed into the box in an at least partially compressed form. This causes a pressing force to which the fillets are subjected, essentially preventing the fillets from moving around in the box.

Flexible element 700 may be, for example, a pressurised gas bladder such as an air bladder, or an element with a cellular structure with the cells filled with gas.

Protective gas, such as ozone or another gaseous substance, can be fed into the box.

It should be noted that frame 69 of the box shown in FIGS. 9 and 10 can also be made of metal or plastic. Frame 69 may be reusable or disposable.

According to an idea, the salt-curing transport container described above is used to cure and/or salt-cure a fillet having a salt content of less than 5%. The produced process liquid is recovered so that it cannot affect the quality of the fillet. Thus, this is a dry-salting and curing process. Because the fillets are on top of each other, an optimum pressing force is formed in them and the fillet becomes firm and well preservable, because the movement of water in the meat has been minimised. A correct fillet has at least 2%, preferably at least 10% of the water in the filled removed during the salt-curing/salting process.

FIG. 11 shows a small package 83 made of metal or plastic and intended for the transport of one or at most ten (10) fillets.

The frame of the package 83 is deep-drawn or injection-moulded plastic and/or metal. The bottom part of the frame 83 has deep shapes made into it to stiffen the structure of the package and to serve as cavities 85, i.e. empty spaces, when a perforated plate 84 has been placed at the bottom of the frame.

As a result of the suction of negative pressure, the film or plastic film 82 presses the fillet 81, because there is negative pressure in the cavities 85. The cavities 85 are also used in receiving process liquid so that it does not come into contact with the fillet.

It is also possible to place a gas emitter into the cavities 85 to form protective gases, such as carbon dioxide, in the manner described earlier herein. The package 83 can be used in both vacuum packaging and protective gas packaging. According to an idea, a net-like means, described in connection with FIG. 5, is arranged in a protective gas package. This way, it is possible to affect the contraction of the fillet.

FIGS. 12 to 18 show a method for transporting and storing fish fillets within an extremely precise temperature tolerance. This solves the problem related to the defrosting and freezing of a fillet that arises when storing the fillet close to its freezing point or when the fillet is in the so-called super-chilled state. Typically, a fish fillet freezes at a temperature below −1.4° C. According to an idea, and optimum transport and storage temperature for a fish fillet is −1.4° C.±0.1° C., when the fish fillet should not freeze at all. The freezing point of the fillet may, of course, also be lower than 1.4° C. depending on the salt content of the fillet.

According to another idea, the fillet is intentionally allowed to freeze in a controlled manner so that ice crystals form inside the fish meat or an ice surface is formed on the fish fillet. In such a case, it is possible that the transport temperature of the fillet is as low as −5° C.

If the temperature variation of the fillet is too great, the fillet may melt and freeze repeatedly, as a result of which large ice crystals form in the meat and break the meat. This type of meat is not of good quality and cannot be used in making cold-smoked salmon, salt-cured salmon or sushi salmon, for instance.

The new method solves this cooling/melting problem, because the temperature can be maintained at an accuracy of ±0.1° C.

FIG. 12 shows on the left a known package 92, in which a plastic film or the like 95 is arranged around a fish fillet 94 placed on a cardboard or plastic underlay 90. When air is removed from inside the film, a known vacuum-packed fish fillet product is formed.

FIG. 12 shows on the right a new package 93, in which the underlay 91 contains cavities, i.e. empty space, in gas exchange-connection with the space, where the fillet 94 is. According to an idea, the underlay 92 is like the one shown in FIG. 7 or 8.

Typical for both underlays 92, 93 is that the underlay 92, 93 extends beyond the fillet 94 at their longitudinal ends and in the lateral direction. According to an idea, this is utilised in the manner described in the following.

FIG. 13 shows an embodiment for positioning packages shown in FIG. 12, for instance, into a storage and transport container 105. The container 105 typically has a bottom part 100, top part 101, and vertical parts 99 on both sides to form a box-like structure. The containers 105 can be placed on top of each other and/or beside each other, and their walls and surfaces are typically straight, i.e. planar.

The container 105 is open into at least two directions either entirely or partly so that cooling air can flow through the container 105 and cool the fillets 94 that are placed on the underlay 90, 91, for example, shown in FIG. 12. According to an idea, the container 105 is shaped in such a manner that the fillets 94 or their packages do not touch each other and there is a free space between them for air flow to flush all surfaces of the package that are essential for cooling the fillet.

According to an idea, the bottom and top parts of the container are mostly—that is more than 50%, but preferably more than 80%—open. This way, two or more containers 105 can be stacked on top of each other to form a tower-like structure, in which air can flow laminarly through all containers in the stack. For the air flow to enter and exit said tower structure, flow space is arranged under the lowest container 105 and above the highest container 105. The container 105 can be shaped to have more than one open wall. According to an idea, the container 105 is only a frame or rack with no or only a few actual surface plates. According to an idea, the container 105 covers only 50%, preferably 40% and more preferably 30% and even more preferably 10% of its external surface area by walls.

The underlays 90, 91 are preferably arranged in the container 105 in such a manner that they are aligned with the air flow, in other words, the narrow edge of the fillet toward the air flow, as shown in FIG. 13.

The enlargement shows how the edge 98 of the underlay 90, 91 is in the corresponding recess or groove 97 of the container 105. This way, the packages and fillets 94 remain in a specific position so that air may flow in a controlled manner between the packages.

In this context, it should be noted that the fillets can be packed into the container 105 in any way as long as they can be kept separate from each other for the air to flow in a controlled manner between the packages. Examples of this include hanging the fillets up, using a suitable spacer, etc.

FIG. 14 shows an embodiment for arranging containers 105 shown in FIG. 13, for example, on top of each other in the transport space 106, preferably cold storage, of a vehicle, such as truck.

According to an idea, the air flow 108 controlling the temperature of the fillets is directed at the tower structure formed by containers 105. The tower is arranged on a platform, such as pallet, that allows the air to flow. The air flow 108 is produced and/or directed by an air flow unit 96 that is arranged to perform the temperature control of an entity made up of one or more towers. Preferably, each air flow unit 96 manages the temperature control of one tower. The temperature of the transport space 106 can be adjusted by one or more air flow units 96. This way, the temperature of different parts of the transport space 106 can be controlled in a precise and controlled manner.

According to an idea, the air flow unit 96 directs the air flow to the containers 105 from the ceiling 107 of the transport space downward. However, the direction of the air flow can also be selected to be from the bottom up or sideways from the walls, for example.

In an embodiment, an air-permeable wall, such as a fabric, perforated or porous plastic film, or the like, which preferably extends the width and length of the transport space, has been placed on the ceiling 107 of the transport space. When air is fed between the ceiling 107 of the transport space and said wall, it spreads evenly on the entire surface area of the transport space.

In another embodiment, one or more bags with a diameter of 200 mm, for example, are arranged in the vicinity of ceiling 107 of the transport space parallel to the ceiling. The bag is made of air-permeable material, such as those already mentioned above. Through openings in the bag, the air flow is distributed evenly on the entire surface area of the transport space.

Small holes, such as microholes, can also be made into the wall or bag to allow a certain amount of air through. According to an idea, this type of wall or bag can also serve as an air filter.

According to an idea, the temperature of the transport space 106 is approximately 0° C. or below zero, 0° C. to −8° C., for example. Most preferably the temperature is between −1° C. and −1.5° C., in which case no ice crystals whatsoever typically form in the fillet. If the temperature is lower than this, −2° C. to −8° C., for example, partial freezing occurs.

FIG. 15 shows an embodiment of using a container according to FIG. 13, for instance.

The container 105 is not heat-insulating in itself, actually quite the opposite. The container 105 can be arranged inside 111 the heat-insulating container 110, in which case the container 105 can be transported to a restaurant or store without the fillets warming up.

In this context, it should be noted that the transport and storage of a fillet in its production and preparation phases is different from how the fillets are delivered to the storage of the end-customer, such as a restaurant or store. FIG. 15 shows an embodiment of packaging the fillet for transport to the storage of the customer. This procedure is done in the very last phase after the transport part that belongs to the preparation of the fillet. For instance, the fillet is transported from Norway to Italy at a temperature of −1° C. as a transport according to FIG. 14 and packed in a package according to FIG. 13. This transport ends in a distribution centre and only there the fillets are placed in a separate heat-insulated container, of which an embodiment is shown in FIG. 15. After the customer has made an order, the goods are delivered in the heat-insulated package.

FIG. 16 shows an embodiment of the method, wherein protective gas packages 113 are transported and stored in a rack 115 that forms a shelf-like construction in such a manner that cooling air 114, 116, 117 can flow around the packages 113 everywhere.

The protective gas package 113 may be a one-fillet package or a protective gas package (MAP) for several, such as ten, fillets.

FIG. 17 is a schematic representation of an embodiment of the method. A product, such as fillet, is packed and stored in a cold storage space 119 that has the same temperature as the transport vehicle 118, for instance a truck, and the load is further unloaded directly into a cold storage space 117 that has the same temperature as the cold storage space 119 and transport vehicle 118. This is a particularly advantageous procedure, when the temperature of the product is close to 0° C., such as −1° C., or in the range of "super-chilled", such as −2° C. to −4° C. The inventors have found that for the quality of the fillet, the minimising of temperature variation is one of the most essential matters from the packaging time to the delivery to the customer, such as store or restaurant.

The concept "super-chilled" refers herein to the state of the fillet in which very small ice crystals are formed inside the fillet, for instance in such a manner that 5% to 25% of the water in the fillet is frozen, in the form of crystals.

FIG. 18 shows a cold-storage vehicle with fish fillet packages placed in its cold storage space 120 in such a manner that a tower-like structure 122 is formed in the manner shown in FIG. 14.

According to an idea, a refrigeration element or air flow controller 123 is placed above the tower-like structure 122. This way, an efficient laminar air flow is achieved from the top 126 through the tower-like structure 122 with the air flow exiting from under 127 said structure.

According to an idea, at least part of the energy required by the refrigeration elements or air flow controllers 123 is generated by solar panels 121. The solar panels may be arranged on the roof of the cold storage space 120, for instance. The typical length of truck cold storage space 120 is approximately 20 m and the width is 2.60 m, in which case the surface area of the roof is 20 m×2.50 m, i.e. 50 m². A typical output is approximately 200 W/m², i.e. this type of solution produces approximately 10 000 W or 10 kW.

FIG. 19 shows an embodiment of the method that utilises a novel type of MAP package.

Typically in known MAP packages, the protective gas is put in the package together with the product, after which the package is hermetically sealed. This type of procedure can naturally be utilised in the present method.

The protective gas can also be formed in the hermetically sealed package during storage or transport by means of a gas emitter inserted in an absorbing pad, for instance, as already described above.

According to an idea, the MAP package comprises a valve that lets gas out of the package in a controlled manner, but does not allow gas to enter the package from the surroundings. In addition, the package comprises means for generating gas inside the package. In other words, the internal gas atmosphere of the package is renewable. This way, the gas atmosphere of the MAP package can be kept fresh and efficient.

According to an idea, the means for generating gas may comprise a gas emitter arranged inside the package to generate carbon dioxide and/or citric acid, or the like. The generated gas may form pressure in the package, which may be released through the valve from the package. However, the valve does not allow gas to enter through it into the package.

According to another idea, the means for generating gas may comprise a compressed gas container that is connected to supply gas into the package.

According to a third idea, the means for generating gas may comprise at least two gas-supplying gas container systems. The first gas container system is arranged to supply passive protective gas that does not kill bacteria but slows down their reproduction, especially in combination with a substantially low temperature. One passive protective gas of this type is carbon dioxide. The second gas container system is arranged to supply reactive gas that kills bacteria. One reactive gas of this type is ozone ($O_3$), for example. Ozone may be already in a gas container or it may be made from oxygen gas supplied from a gas container in an ozone reactor reserved for this purpose. Because ozone is an unstable gas, it is preferable to produce it on site in an ozone reactor.

In the embodiment shown in FIG. 19, the gas container system comprises three containers with pure oxygen ($O_2$) arranged in the first container 125, with oxygen and a protective gas, which is carbon dioxide, mixed therein in the second container 126, and oxygen and a protective gas, which is nitrogen ($N_2$) in the third container 127. The second and third container 126, 127 may alternatively contain pure protective gas or a protective gas mixture, such as carbon dioxide and nitrogen.

The gas or gas mixture is led to a control centre 124, through which gas of different type can be directed straight 128 or 129 to the package by adjusting valves 131. The control centre 124 may be equipped with an ozone reactor for producing ozone.

The control centre 124 also preferably has a discharge system for the gas used in the package. This may be implemented, for example, by utilising the same channel, from which the gas is led in the package, but by turning the gas flow into the opposite direction. Another alternative is to use in the package a separate discharge channel, which may be equipped with a valve adjusting the gas flow.

According to an idea, the gas supply system only comprises an ozone reactor and oxygen gas source: as the ozone reacts with organic matter, it turns into carbon dioxide, i.e. protective gas, and water. The package can be equipped with a water-drainage channel or the like.

The volume of the gas container 125, 126, 127 is 1 to 100 ml, for instance, depending on the volume of empty space in the package.

According to an idea, the gas container is integrated into one unit with the control unit 124, on one circuit board, for example. Said unit may comprise fastening elements, with which is quickly detached and replaced by a new unit.

FIG. 20 shows an embodiment for placing a control centre 132 inside a package 137, and another embodiment for placing a control centre 133 outside a package 137. A fish fillet 139 is preferably positioned 140 in such a manner that gas surrounds it as much as possible from every side.

This type of modified atmosphere package (MAP) typically comprises only passive generated protective gas, such as carbon dioxide. However, other gases than just passive protective gases can be used, such as the reactive gases, such as ozone, already mentioned above, or a mixture of passive and reactive gases.

According to an idea, a MAP package is equipped with a valve 136 that lets gas out of the package, but not in the package. The valve 136 can also be placed in the control centre 132, 133 in such a manner that used gas can be discharged from the package 137.

According to an idea, the volume of the package 137 is 0.3 to 1 litres, but it may also be substantially larger than this, even up to 150 m$^3$, in other words within the range of the cold storage space of the largest cold containers or cold storage vehicles.

With the valve in the package, a passive protective gas atmosphere can be replaced with a reactive gas atmosphere and vice versa. The supply of gases can be controlled by automatic control means known per se, which open and close the valves adjusting the gas flow from the containers to the package on the basis of signals provided by sensors monitoring the state of the package.

According to an idea, ozone is arranged in ice that is placed in a separate insulated package connected by a flow channel to the package. Ice is allowed to melt in a controlled manner, whereby ozone gas is released into the package. According to an idea, an MAP package using two or more gases contains at least 10 kg of fish product, preferably over 10 kg, such as 100 to 1000 kg fish product. According to an idea, this type of MAP package is one in which a pre-rigor fillet cures/is salted during transportation and in which process liquid is collected to prevent it from affecting the fillet. By using reactive gas in said package at least periodically, it is possible to reduce the growth of bacteria quite substantially.

An embodiment of the invention is presented in FIG. 21, where the salty and spicy liquid 980 formed during the dry-salting process is recovered for further processing.

Fish fillets 990 are under compression, causing liquid to be eliminated from the fish meat during the salt-curing process; this liquid comprises brine and possibly spices that have not been absorbed into the fillets but end up at the bottom of transport container 960.

In a certain embodiment, the liquid in question is removed so that it can no longer come into contact with the fillets.

In another embodiment, the liquid in question is fed back into contact with the fillets, even being recirculated several times back into contact with the fillets. The benefit of this is that the absorption of salt and the spices into the fish meat can be enhanced. Said absorption is typically rather slow into meat that is in a pre-rigor state.

The utilisation of liquid used once can be implemented by, for example, by raising the liquid above fillets 990 and allowing it to flow back over the fillet surfaces to the bottom of transport container 960. A pump pumping the liquid, for instance, can be used for this purpose, raising the liquid above the fillets via channel 1000. In another embodiment, gas such as carbon dioxide or another gaseous substance 1030 is blown into the liquid at the bottom of the transport container, raising the liquid upwards in relation to the fillets. In both embodiments, fillets 990 sink towards the bottom of transport container 960, because the saline solution no longer holds them up.

In an embodiment, used liquid is led away from the fillets by feeding it into enclosed space 1040 in transport container 960; this space can be a bag arranged on top of or between the fillets, or in space 1020 outside transport container 960.

Feeding the liquid into enclosed space 1040 does not change the total volume of the fillets and the liquid. This being the case, the increasing volume of the liquid collected in enclosed space 1040 and the resulting compression can be used to prevent the uncontrolled movement of fillets 990 inside transport container 960. This embodiment of the method is still a dry salting method, because the fillets are under compression, and salt that removes liquid from the fish meat is applied. Another benefit is that the liquid keeps air away from the surface of the fish meat, resulting in non-existent oxidisation of the fish meat.

According to a certain idea, transport container 960 is of a drum type, whereby the fillets are arranged in a drum that can be closed. The drum can be rotated around its axis of rotation, rotating the bottommost fillet to the top, and vice versa.

The drum can be round, such as a clothes drying drum, for example, and preferably also perforated, allowing the liquid to flow out evenly.

Such a rotating fish curing drum can be encapsulated in such a manner that it becomes what is essentially a tight enclosure/package.

During transport, the drum rotates twice per day, for example.

The rotating force can be mechanical, for example implemented by a spring, or electrical.

The benefit is that the fillet compression force is nearly identical for all fillets, and its nearest equivalent is a traditional dry salting method from centuries ago in which the location of the fillets was changed twice per day. This original method is still used today, but only for expensive, high-quality products due to its being extremely labour-intensive.

The new application disclosed enables the performance of a curing procedure, such as dry salting, during transport.

In some cases, features disclosed in this application may be used as such, regardless of other features. On the other hand, when necessary, features disclosed in this application may be combined in order to provide different combinations.

The drawings and related disclosure are only intended to illustrate the inventive idea. It is apparent to a person skilled in the art that the invention is not restricted to the embodiments described above, in which the invention is disclosed through some examples, but various modifications and different applications of the invention are feasible within the inventive idea defined in the accompanying claims.

The invention claimed is:

1. A method for preparing a fish product, the method comprising:
filleting a slaughtered fish in pre-rigor state,
removing the skin from fillet in pre-rigor state,
arranging the skinless fillet in a pre-salting process in pre-rigor state and allowing it to be there for a pre-salting time,
removing the fillet from the pre-salting process,
arranging several fillets into a transport package, where the fillets are subjected to a dry salting process,
allowing the fillets to remain in the transport package for at least one day, and
in which transport package, a compressive force is applied to the fillets placed in the transport package, the load history caused by the force essentially being equal for each fillet.

2. A method as claimed in claim 1, wherein the method steps performed in pre-rigor state are done within 24 hours from slaughter.

3. A method as claimed in claim 1, wherein the temperature of the fillet in the transport package is maintained at −5° C. to +4° C.

4. A method as claimed in claim 1, wherein the fillet is allowed to cure or salt-cure in the transport package for at least 2 days.

5. A method as claimed in claim 1, wherein the skinless fillet is subjected to an antibacterial treatment before placing it in the pre-salting process.

6. A method as claimed in claim 5, wherein the antibacterial treatment comprises sterilisation by ozone ($O_3$), cold plasma treatment, hot plasma treatment, strong salt solution (salt content 8% to 33%), salt solution with ozone and/or hypochlorous acid (HClO) dissolved therein, ultraviolet light, laser radiation, alcohol or any combination thereof.

7. A method as claimed in claim 1, wherein the pre-salting process is a solution salting process, in which the salt content of the solution is 3% to 33%.

8. A method as claimed in claim 7, wherein the temperature of the solution is at most +8° C.

9. A method as claimed in claim 7, wherein the fillet is arranged for the pre-salting process in the same container with other fillets, and a pressing force is directed to the fillets.

10. A method as claimed in claim 1, wherein the fillet stays in the pre-salting process for 3 to 48 hours.

11. A method as claimed in claim 7, whereby the solution salting process is implemented using injection salting.

12. A method as claimed in claim 1, wherein the dark meat under the skin is removed from the fillet before placing the fillet in the pre-salting process.

13. A method as claimed in claim 1, wherein the temperature of the fillet is maintained at a temperature range of −2° C. to +12° C. in the method steps preceding the pre-salting process.

14. A method as claimed in claim 1, wherein the fillet is packed in a transport package, in which the fillet is pressed and in which the liquid releasing from the fillet is led away so as not to contact the fillet.

15. A method as claimed in claim 14, wherein liquid released from the fillets is led back into contact with the fillets.

16. A method as claimed in claim 15, wherein liquid released from the fillets is recirculated back into contact with the fillets several times.

17. A method as claimed in claim 1, wherein uninsulated transport packages are placed for transport in the transport space of a vehicle with empty space between the transport packages, and
wherein an air flow is directed around the transport packages and between them to control the temperature during transport.

18. A method as claimed in claim 17, wherein the temperature of the air flow is adjusted so that the temperature variation of the fillets is at most ±0.1° C.

19. A method as claimed in claim 1, wherein the fillet is packed in a transport package that comprises a net-like elastic or rigid compression element, inside which the fillet is arranged.

20. A method as claimed in claim 1, wherein the transport package is equipped with a valve that allows gas to release from the package, but does not let gas into the package.

21. A method as claimed in claim 20, wherein gas is fed into the package from a gas container.

22. A method as claimed in claim 21, wherein gas is fed into the package from at least two gas containers with different gas contents.

23. A method as claimed in claim 22, wherein carbon dioxide and ozone are fed into the package, and the gas atmosphere of the package is adjusted by controlling the feeding ratios.

24. A method as claimed in claim 1, wherein spices are added to fillet after the pre-salting process but before the fillet is arranged in a transport package.

25. A method as claimed in claim 24, wherein the spice comprises salt.

26. A method as claimed in claim 1, wherein one or more aromatic oils, dry spice, fresh spice, alcohol or other spices are added to the fillet after the pre-salting process.

27. A method as claimed in claim 1, wherein bones are removed from the fillet after the pre-salting process, before the fillet is arranged into the transport package.

28. A method as claimed in claim 1, wherein bones are removed from the fillet after the fillet is removed from the transport package.

29. A method as claimed in claim 1, wherein a compressive force directed at the fillets arranged in the transport package is generated with a gas-filled flexible element placed in the transport package in an at least partially compressed form.

30. A method as claimed in claim 29, wherein a gas-filled flexible element comprises a cellular structure, where the cells are filled with gas.

31. A method as claimed in claim 1, wherein the transport package comprises a rotatable drum.

* * * * *